(12) United States Patent
Kobayashi et al.

(10) Patent No.: US 7,637,759 B2
(45) Date of Patent: Dec. 29, 2009

(54) CARD CONNECTOR

(75) Inventors: Mitsuru Kobayashi, Shinagawa (JP);
Koichi Kiryu, Shimotakai-gun (JP);
Hideo Miyazawa, Shinagawa (JP);
Yasuyuki Miki, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 12/361,563

(22) Filed: Jan. 29, 2009

(65) Prior Publication Data

US 2009/0197445 A1  Aug. 6, 2009

(30) Foreign Application Priority Data

Feb. 1, 2008 (JP) .................. 2008-022925
Mar. 19, 2008 (JP) .................. 2008-071751
Jul. 9, 2008 (JP) .................. 2008-178794

(51) Int. Cl.
*H01R 13/62* (2006.01)

(52) U.S. Cl. .................. 439/159; 439/153

(58) Field of Classification Search .......... 439/152–160
See application file for complete search history.

(56) References Cited

U.S. PATENT DOCUMENTS

| | | | |
|---|---|---|---|
| 6,162,075 A * | 12/2000 | Hara et al. | 439/159 |
| 6,399,906 B1 * | 6/2002 | Sato et al. | 200/61.59 |
| 6,638,087 B1 * | 10/2003 | Takada et al. | 439/188 |
| 6,848,923 B2 * | 2/2005 | Takada et al. | 439/188 |
| 7,309,245 B2 * | 12/2007 | Sadatoku | 439/159 |
| 7,435,115 B2 * | 10/2008 | Kiryu et al. | 439/159 |

FOREIGN PATENT DOCUMENTS

JP  2007-157424  6/2007

* cited by examiner

*Primary Examiner*—Chandrika Prasad
(74) *Attorney, Agent, or Firm*—IPUSA, PLLC

(57) ABSTRACT

A card connector for inserting a card therein is disclosed. The card connector includes a housing body having a contact, a cover covering the housing body, a slider being movable between a card ejected position and a card attached position. The slider includes a slider body and a leaf spring part attached to the slider body for elastically locking to the card. The card connector includes an excess bending preventing part configured to prevent permanent deformation of the leaf spring part by the card being inserted into the card connector in an irregular manner.

11 Claims, 36 Drawing Sheets

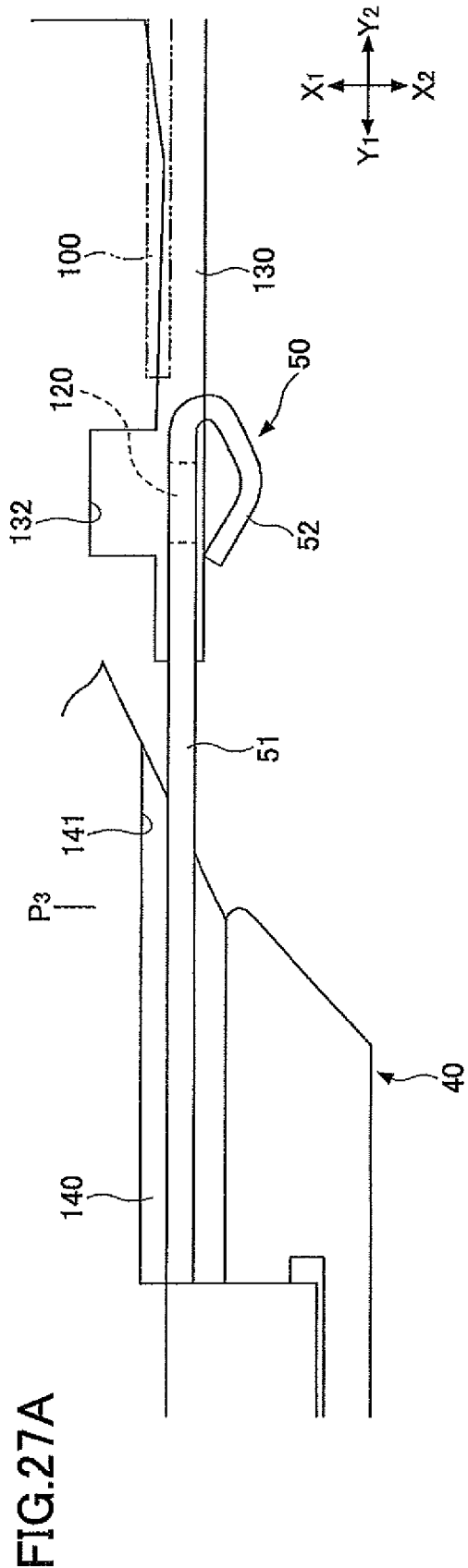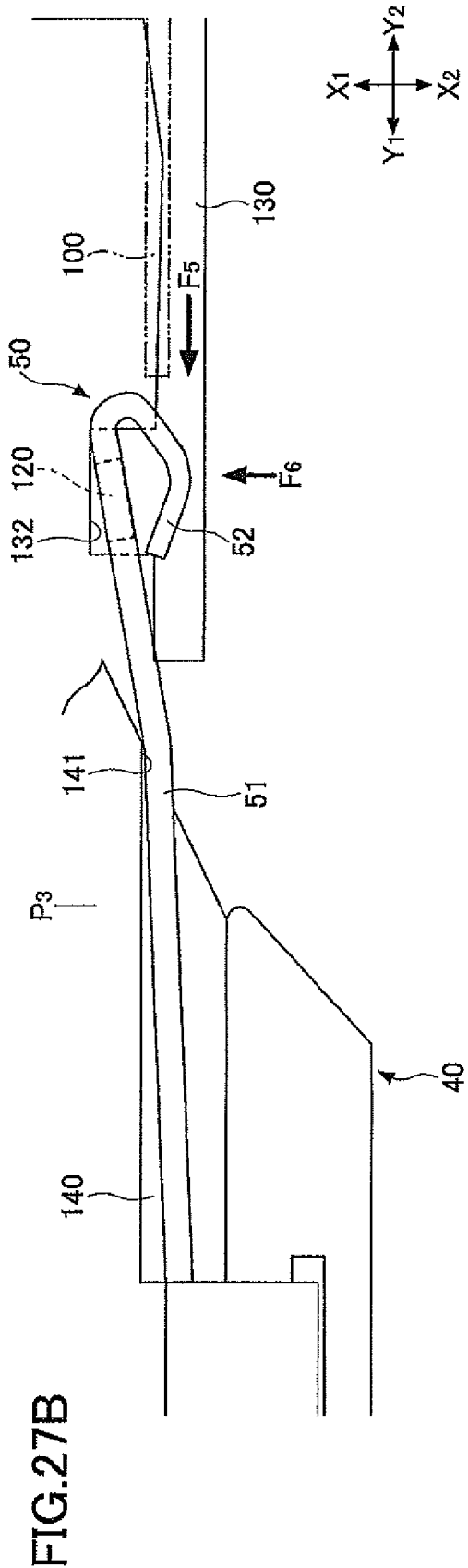

FIG.30
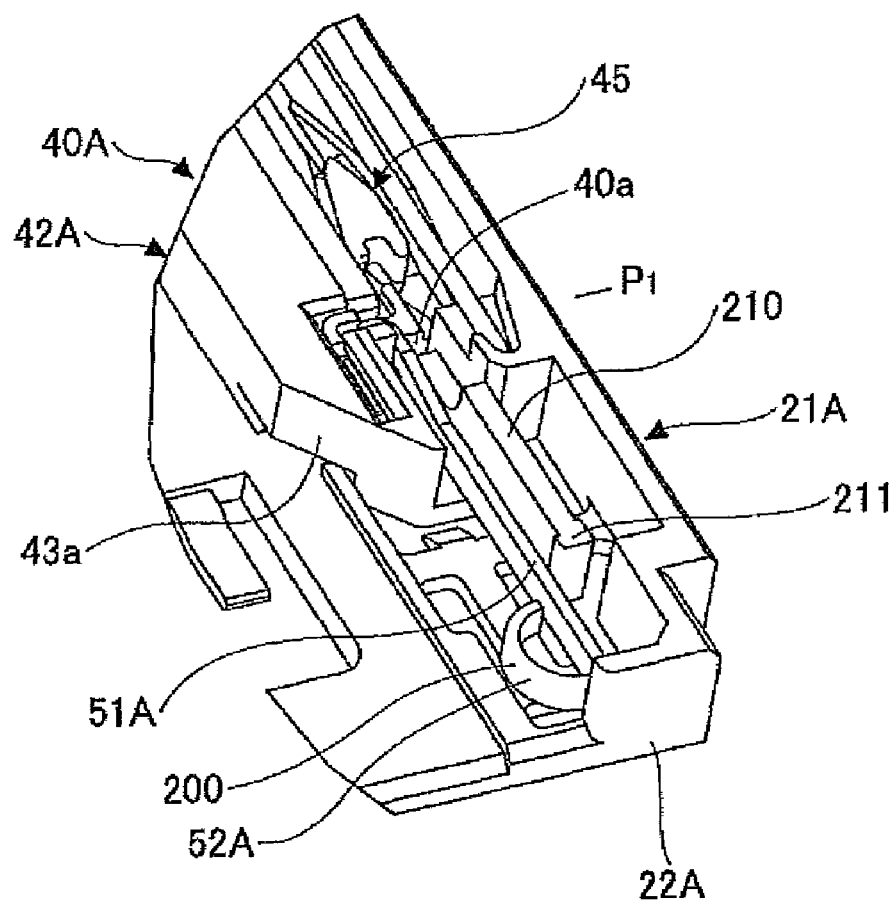
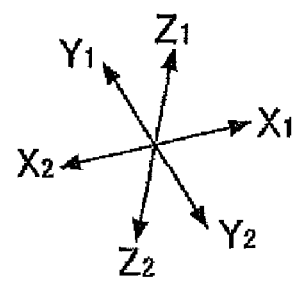

FIG.33
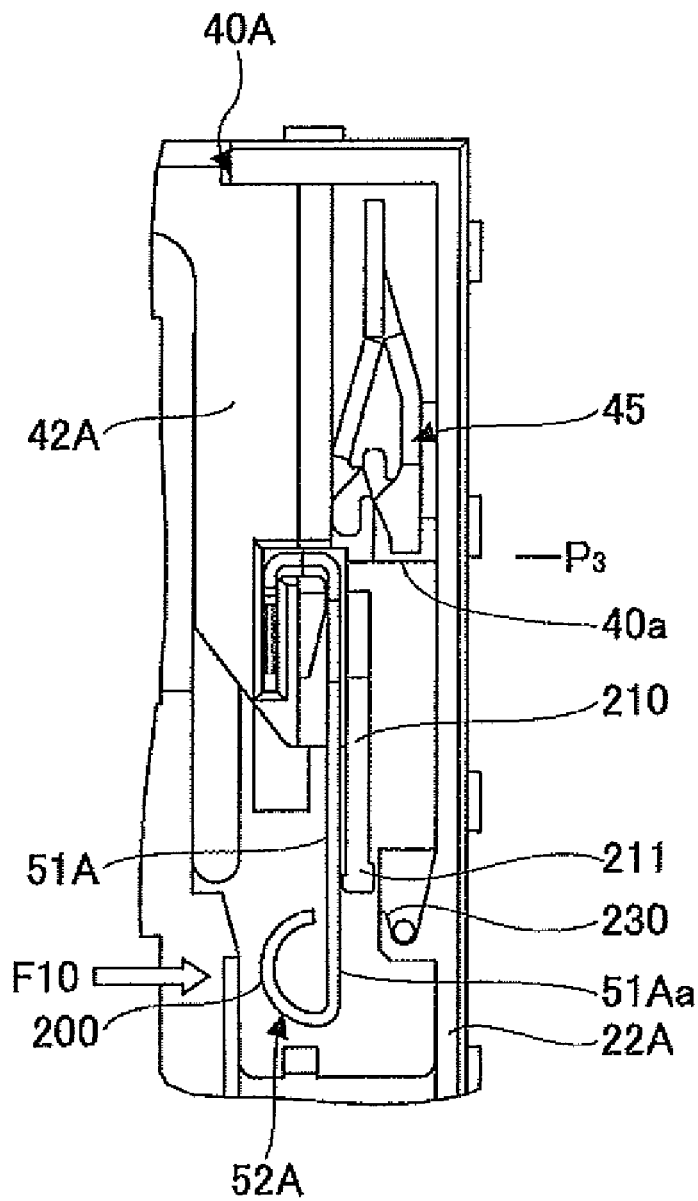
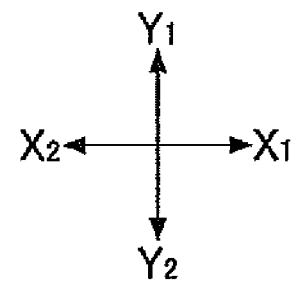

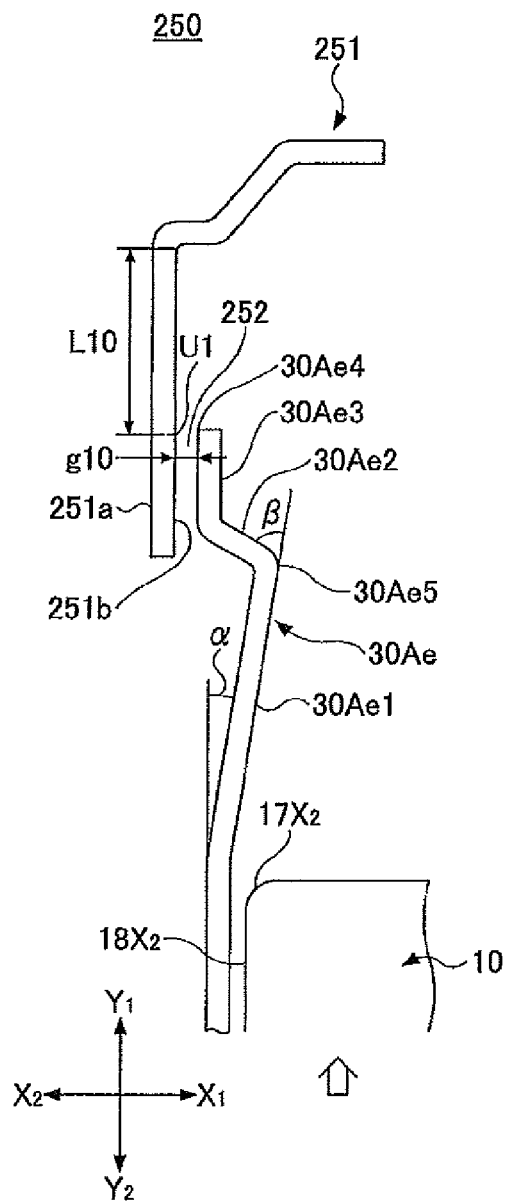
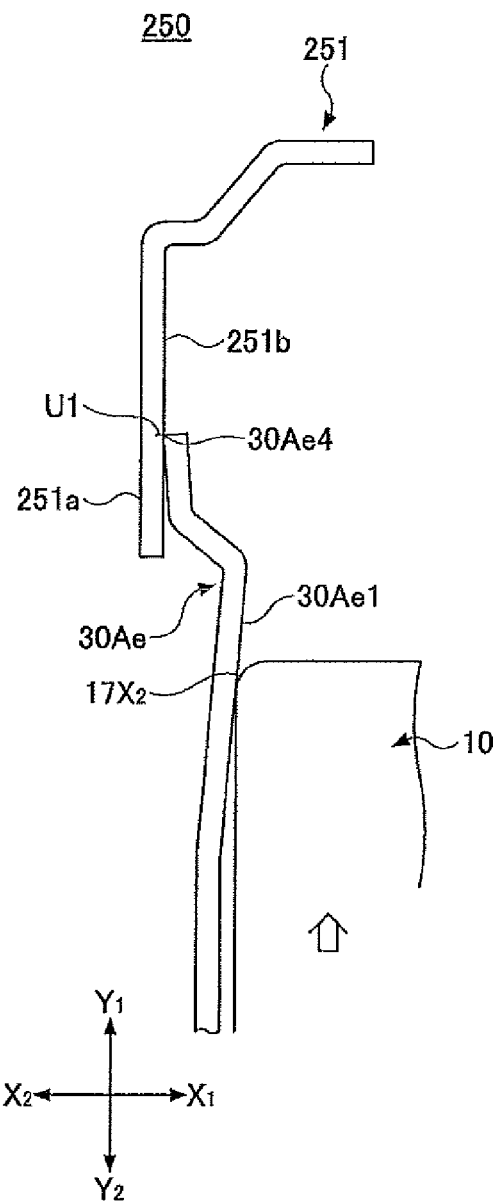

CARD CONNECTOR

BACKGROUND OF THE INVENTION

1. Field of the Invention

The present invention generally relates to a card connector assembled in an electronic device for connecting to a card.

2. Description of the Related Art

Electronic devices, such as digital cameras, portable audio devices, and mobile phones are configured to be used with a memory card having a semiconductor device installed. Recent memory cards are provided in miniature sizes compared to the previous generation of memory cards. Further, various miniature memory card connectors are also provided for attaching the miniature memory card.

For example, these miniature memory cards are developed to adapt to increasing functions of the mobile phone. Recent mobile phones have a miniature memory card connector for enabling usage of the miniature memory cards.

Mobile phones are used in many different situations. For example, the mobile phone may be carried around by the user, operated in a folded state, or connected to a data reading device. Therefore, the miniature memory card is also attached to or detached from a corresponding miniature memory card connector in various situations. Further, the miniature memory card may be difficult for the user to handle because the length of one side of the memory card is extremely small (e.g., approximately 10 mm). Therefore, compared to the previous generation of memory cards, many aspects are to be considered when designing the current miniature memory cards.

Typically, the miniature memory card connector includes a slider. The slider has a leaf spring for elastically locking to a groove part provided at a side surface of a miniature memory card. The slider locks with the inside of the miniature memory card connector by an engaging mechanism using a heart cam and is forced to protrude from the miniature memory card connector by the leaf spring. The miniature memory card is attached to the miniature memory card connector in a manner elastically locked to the slider by the leaf spring. The friction between a pad of the miniature memory card and a contact of the miniature memory card connector also serves to maintain the attached state of the miniature memory card. In a case of ejecting (detaching) the miniature memory card from the miniature memory card connector, the user first pushes the miniature memory card further into the miniature memory card connector with his/her finger and then releases the miniature memory card so that the locked slider is released and partly projects from an insertion slot together with the miniature memory card. In this projected state, the miniature memory card is still attached to the miniature memory card connector by being elastically locked to the slider by the leaf spring. Then, by pinching and pulling the protruding part of the miniature memory card with the user's fingertips, the miniature memory card can be released and pulled out from the miniature memory card connector (see, for example, Japanese Patent Application No. 2005-351884).

Because the miniature memory card is small and thin, it is difficult to increase the amount of locking force applied from the slider to the miniature memory card in a case of attaching or detaching the miniature memory card with respect to the miniature memory card connector.

Therefore, in a case where the leaf spring of the slider becomes bent due to permanent deformation, the locking force of the slider with respect to the miniature memory card decreases and causes the miniature memory card to emerge and fall out from the miniature memory card connector. For example, in a case where the miniature memory card is undesirably ejected from the miniature memory card connector due to shock or the like applied to the miniature memory card attached to the miniature memory card connector, communications of the mobile phone containing the miniature memory card may be adversely affected. Further, once the miniature memory card falls out from the miniature memory card connector, the miniature memory card may become lost due to its small size.

The miniature memory card connector according to a related art example is designed to prevent the leaf spring of the slider from being bent by permanent deformation as long as the miniature memory card is inserted into the miniature memory card connector in a regular manner.

However, the miniature card connector according to the related art example is not sufficiently designed to cope with a miniature memory card being inserted in an irregular manner (for example, inserted in a slanted manner). Since some types of miniature memory cards have a tip (tip toward the inserting direction) that is narrower than the insertion slot of the miniature memory card connector, these types of miniature memory cards are very likely to be inserted in a slanted manner.

SUMMARY OF THE INVENTION

The present invention may provide a card connector that substantially eliminates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a card connector particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a card connector for inserting a card therein, the card connector including a housing body having a contact, a cover covering the housing body, a slider being movable between a card ejected position and a card attached position, the slider including a slider body and a leaf spring part attached to the slider body for elastically locking to the card, the card connector including: an excess bending preventing part configured to prevent permanent deformation of the leaf spring part by the card being inserted into the card connector in an irregular manner.

Other objects and further features of the present invention will be apparent from the following detailed description when read in conjunction with the accompanying drawings.

BRIEF DESCRIPTION OF THE DRAWINGS

FIG. 27A is a schematic diagram illustrating a buckling preventing structure according to an embodiment of the present invention;

FIG. 27B is a schematic diagram for describing an operation of the buckling preventing structure of FIG. 27A;

FIG. 30 is an enlarged view illustrating a portion of a card connector surrounded by a circle XXX of FIG. 28 where a cover is removed from the card connector;

FIG. 33 is a schematic diagram illustrating where a slider is moved to a maximum insertion position according to an embodiment of the present invention;

FIG. 36A is a schematic diagram illustrating a switch before a card is inserted into a card connector according to an embodiment of the present invention;

FIG. 36B is a schematic diagram illustrating a switch where a card is inserted into a card connector according to an embodiment of the present invention;

DESCRIPTION OF THE PREFERRED EMBODIMENTS

In the following, embodiments of the present invention are described with reference to the accompanying drawings.

First Embodiment

Figure 1:
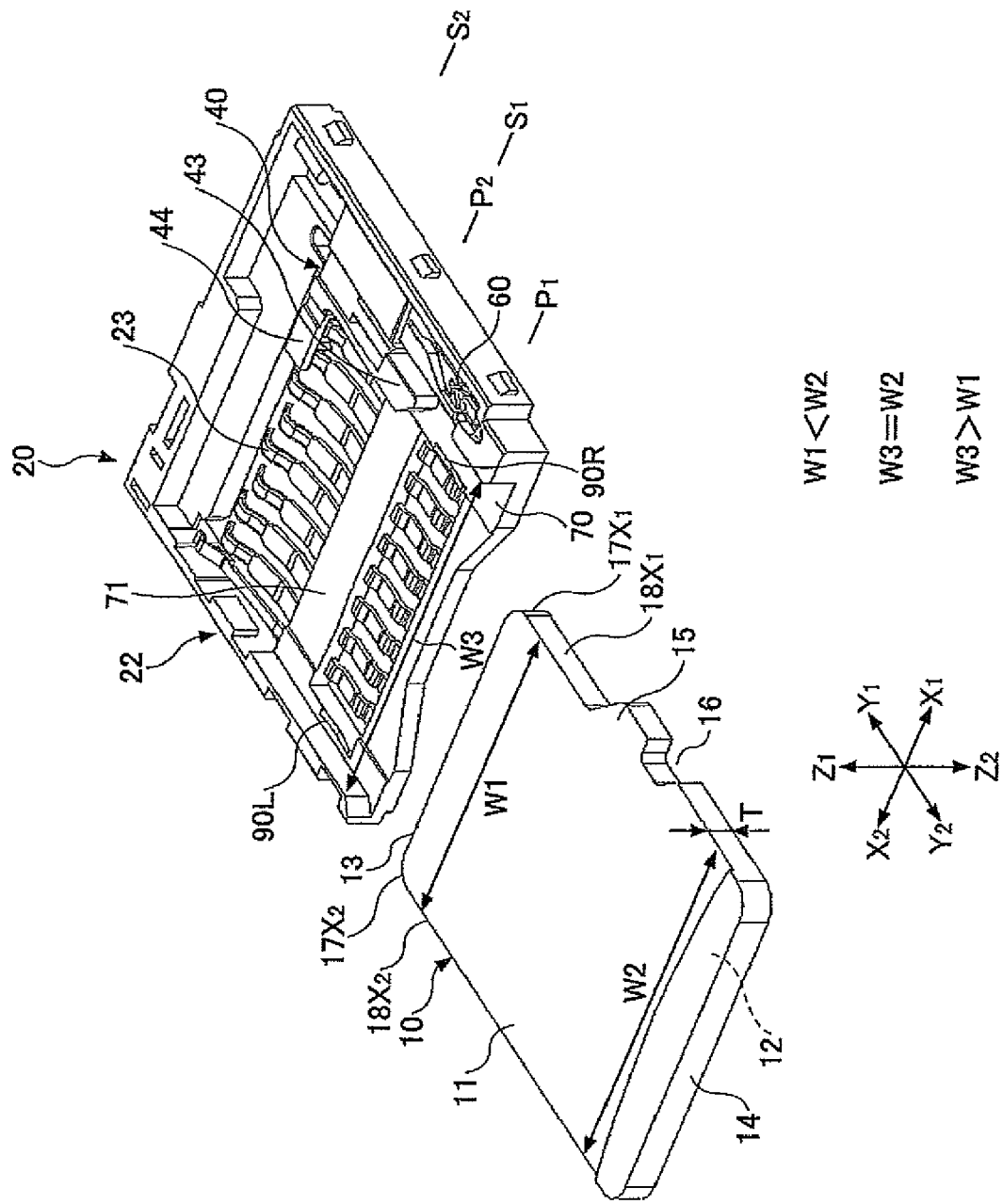
FIG. 1 is a perspective view illustrating a card and a corresponding card connector without a cover according to a first embodiment of the present invention.
Figure 2:
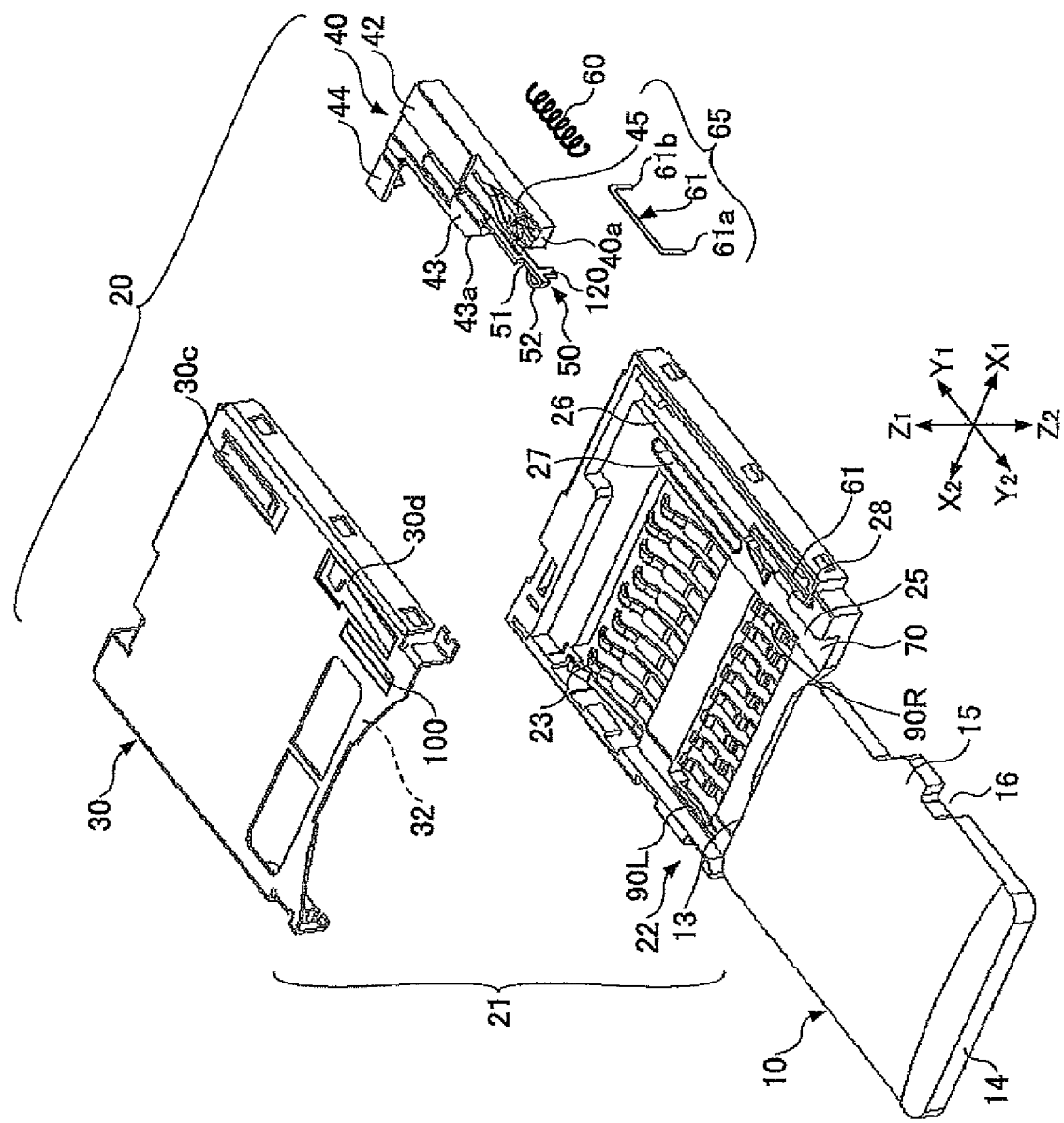
FIG. 2 is an exploded perspective view illustrating the card connector of FIG. 1.
Figure 3C:
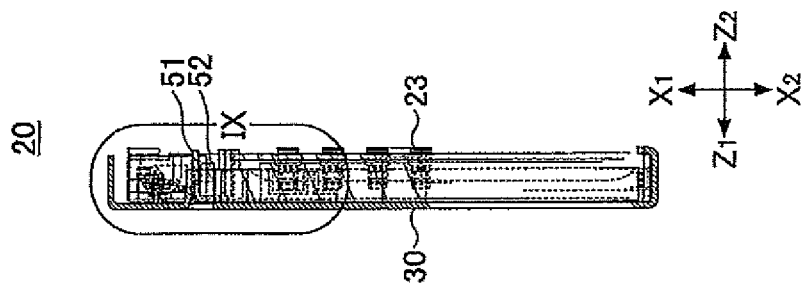
FIG. 3C is a longitudinal cross-sectional view of a card connector taken along a line IIIC-IIIC of FIG. 3A according to an embodiment of the present invention.
Figure 3A:
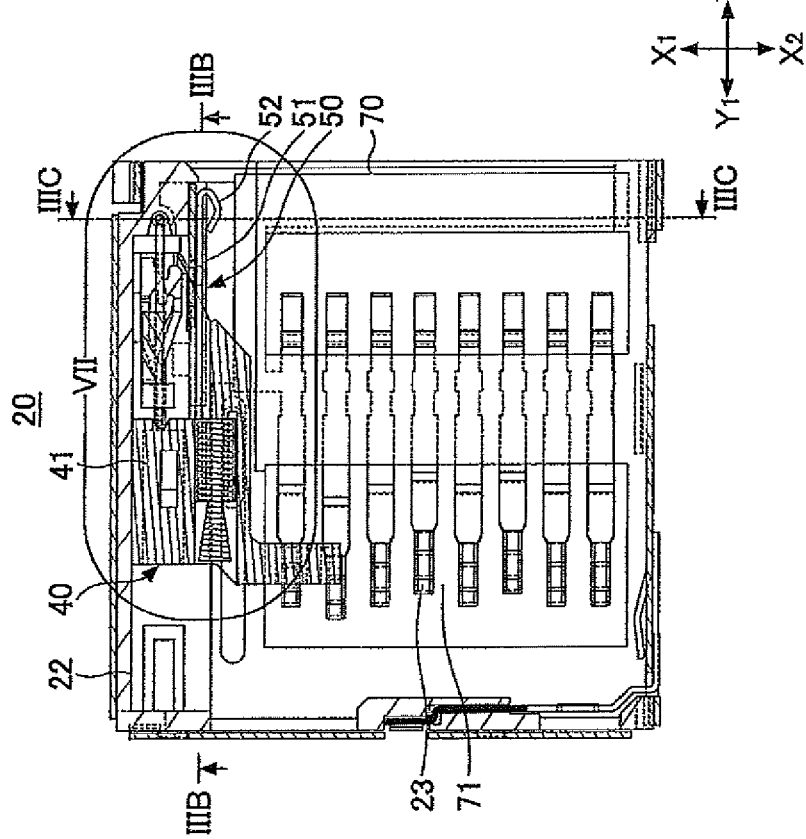
FIG. 3A is a lateral schematic plan view of a card connector taken along at a part where the cover is to be positioned according to an embodiment of the present invention.
Figure 3B:
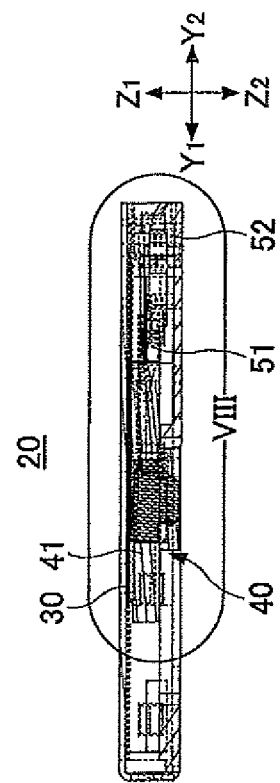
FIG. 3B is a longitudinal cross-sectional view of a card connector taken along a line IIIB-IIIB of FIG. 3A according to an embodiment of the present invention.

FIG. 1 is a perspective view illustrating a microSD (trademark) card (hereinafter also referred to as "card") 10 and a corresponding microSD (trademark) card connector (hereinafter also referred to as "card connector") 20 without a cover 30 according to a first embodiment of the present invention. For the sake of convenience, a slider 40 is illustrated in an attached position. FIG. 2 is an exploded perspective view illustrating the card connector 20. FIG. 3A is a lateral sectional plane view of the card connector 20 taken along at a part where the cover 30 is to be positioned. FIG. 3B is a longitudinal sectional plane view of the card connector 20 taken along the line IIIB-IIIB of FIG. 3A. FIG. 3C is a longitudinal sectional plane view of the card connector 20 taken along the line IIIC-IIIC of FIG. 3A. In the drawings, directions X1 and X2 indicate the width direction of the card connector 20, directions Y1 and Y2 indicate the length direction of the card connector 20, and directions Z1 and Z2 indicate the thickness (height) direction of the card connector 20. The direction Y1 indicates the direction in which the card 10 is inserted and attached to the card connector 20. The direction Y2 indicates the direction in which the card 10 is ejected from the card connector 20. In terms of the card 10, the end situated toward the direction Y1 is a front end of the card 10 and the end situated toward the direction Y2 is a rear end of the card 10.

As illustrated in FIG. 1, the card 10 includes a top surface 11, a bottom surface 12, a front end surface 13, a rear end surface 14, and side surfaces 18X1, 18X2. The card 10 has an IC memory installed therein. An array of pads (not illustrated) is provided at a bottom side of the front end surface 13. A convex part 15 and a concave part 16 are provided at the side surface 18X1 in the direction X1. In FIG. 1, reference numeral 17X1 indicates a first corner part provided between the front end surface 13 and the side surface 18X1 in the direction X1, and reference numeral 17X2 indicates a second corner part provided between the front end surface 13 and the side surface 18X2. The width W1 of the front end surface 13 is less than the width W2 of the rear end surface 14.

[Configuration of Card Connector 20]

First, an exemplary configuration of the card connector 20 is described.

The card connector 20 includes, for example, a connector housing 21, a slider 40, a compression coil spring 60, and a heart cam mechanism 65. Further, a card insertion slot 70 is provided at the end of the card connector 20 toward the direction Y2. The width W3 of the card insertion slot 70 is substantially equal to the width W2 of the rear end surface 14 of the card 10 and is greater than the width W1 of the front end surface 13 of the card 10.

The connector housing 21 includes a housing body 22 having an array of contacts 23 fixed thereto and the cover 30 covering the upper side of the housing body 22. The housing body 22 is formed of, for example, a synthetic resin. The cover 30 is formed of, for example, a metal plate material. By combining the housing body 22 and the cover 30, the card insertion slot 70 for inserting the card 10 thereto and a card installing part 71 for holding the inserted card 10 are formed.

The cover 30 includes, for example, a leaf spring part 30c for pressing against the slider 40 and a leaf spring part 30d for pressing against a linking member 61 (described below).

The slider 40 includes a slider body 42 having an L-like shape and a locking leaf spring (hereinafter simply referred to as "leaf spring") 50 fixed to the slider body 42. The slider body 42 is formed of, for example, a synthetic resin. The slider body 42 includes an overhanging part 43 overhanging in the direction X2, a card receiving part 44 projecting in the direction X2 for receiving the front end surface 13 of the card 10, and a heart cam groove 45 formed at the end of the slider body 42 toward the direction Y2. The leaf spring 50 includes a cantilever leaf spring part (hereinafter referred to as "leaf spring part") 51 projecting in the direction Y2 from the slider body 42 and a locking part 52 formed at the tip of the leaf spring 50. The leaf spring part 51 is configured to bend in the directions X1, X2. The locking part 52 is formed into a substantially triangular shape projecting in the direction X2 by bending back the tip of the leaf spring 50 in the directions X2 and Y1. The locking part 52 is configured to be displaced in the direction X1 in correspondence with the bending of the leaf spring part 51. The locking part 52 is configured to project with respect to the X1 side of the card installing part 71. The overhanging part 43 is configured to face the convex part 15. The locking part 52 is configured to engage the concave part 16.

The slider 40 is assembled in the housing body 22 in a manner capable of sliding in the directions Y1 and Y2 along a guiding groove 26 of the housing body 22. In this embodiment, the slider 40 is positioned at the inner side of the housing body 22 toward the direction X1 and in the space between an upper surface 25 of the housing body 22 and a bottom surface 32 of the cover 30. The slider 40 has an end face 40a provided at its end toward the direction Y2 configured to slide in the directions Y1 and Y2 between a position P1 and a position P3. The position P1 corresponds to a position of the end face 40a where the card 10 is detached from the card connector 20. The position P3 corresponds to a position of the end face 40a where the card 10 is inserted into the card connector 20 the maximum distance toward direction Y1 (to maximum insertion position P3 of the slider 40). The below-described position P2 corresponds to a position of the end face 40a where the card 10 is finally attached to the card connector 20 (card attached position of the slider 40). The position P1 corresponds to a final position of the slider 40 toward the direction Y2 (card ejecting position of the slider 40). The end face 40a abuts an upright surface 28 of the housing body 22 in the case where the slider 40 is in the card ejecting position. The overhanging part 43 is configured to move between the below-described positions S1 and S3.

The slider 40 is assembled in the housing body 22 together with the compression coil spring 60 and the linking member 61. The compression coil spring 60 is mounted in a groove 27. The slider 40 is pressed toward the direction Y2 by the compression coil spring 60 so that the end face 40a is moved to the position P1. The linking member 61 has a first end 61a provided toward the direction Y2 and a second end 61b provided toward the direction Y1. The first end 61a engages the housing body 22. The second end 61b engages the heart cam 45. The heart cam mechanism 65 is formed by attaching the linking member 61 to the heart cam groove 45.

[Card Attaching Operation in a Case where the Card 10 is Properly Inserted into the Card Connector 20]

In this embodiment, properly inserting the card 10 represents the card 10 being inserted into the card connector 20 from a regular direction. In this embodiment, the regular direction represents a direction along a center line of the card connector 20 extending in the directions Y1-Y2.

Prior to attaching the card 10 to the card connector 20, the end face 40a of the slider 40 is located at the position P1.

Figure 4A:
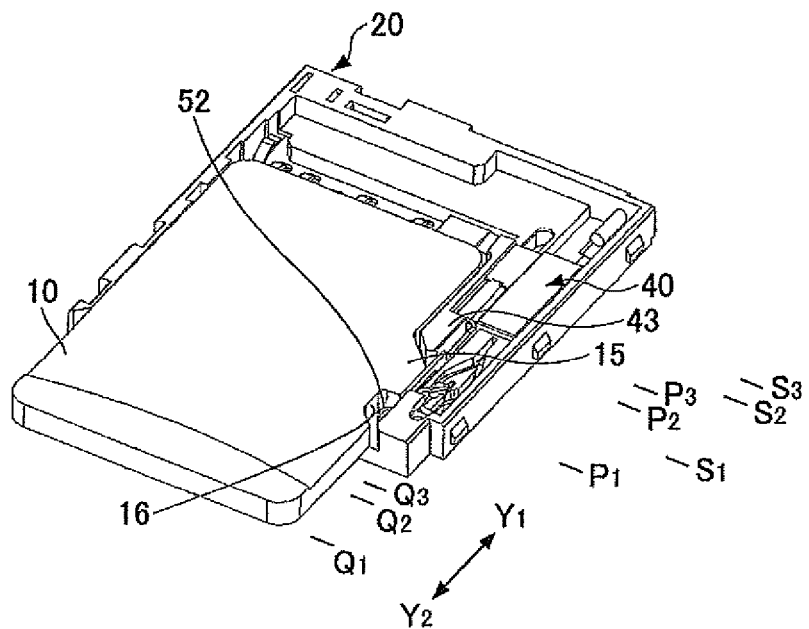
FIGS. 4A-4C are schematic diagrams for explaining an operation of attaching a card according to an embodiment of the present invention.
Figure 4B:
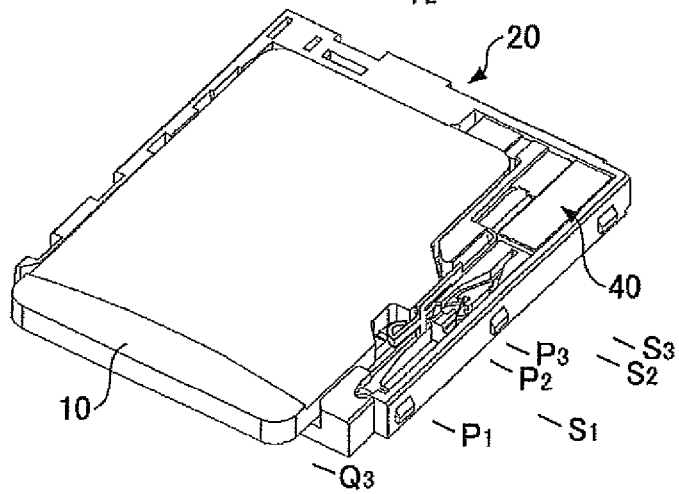
Figure 4C:
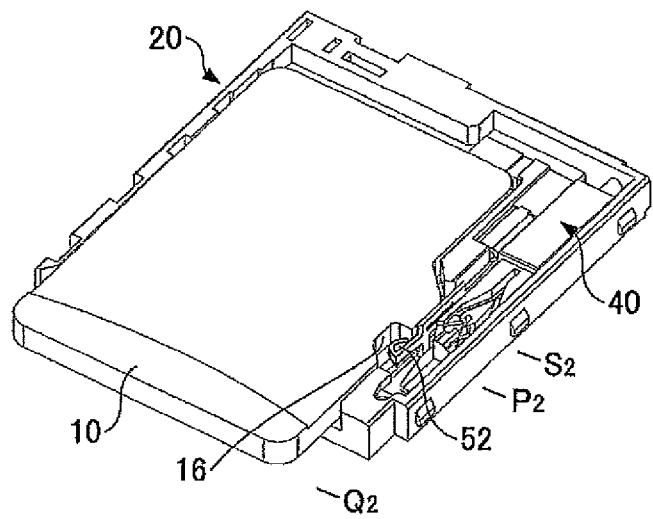

The attachment of the card 10 is performed as follows. The position of the card 10 is explained by describing the position of the rear end surface 14 of the card 10. FIGS. 4A-4C are schematic diagrams for explaining the attachment of the card 10.

The operation of attaching the card 10 is performed by having the user insert the card 10 into the card insertion slot 70 and push the rear end surface 14 to a maximum insertion position Q3 with his/her fingertips.

First, as illustrated in FIG. 4A, when the card 10 is inserted and pushed into the card insertion slot 70 to a position in which the rear end surface 14 is in the position Q1, the front end surface 13 of the card 10 contacts the card receiving part 44 while the convex part 15 contacts the overhanging part 43. When the rear end surface 14 is in the position Q1, the lock part 52 engages the concave part 16.

Figure 5:
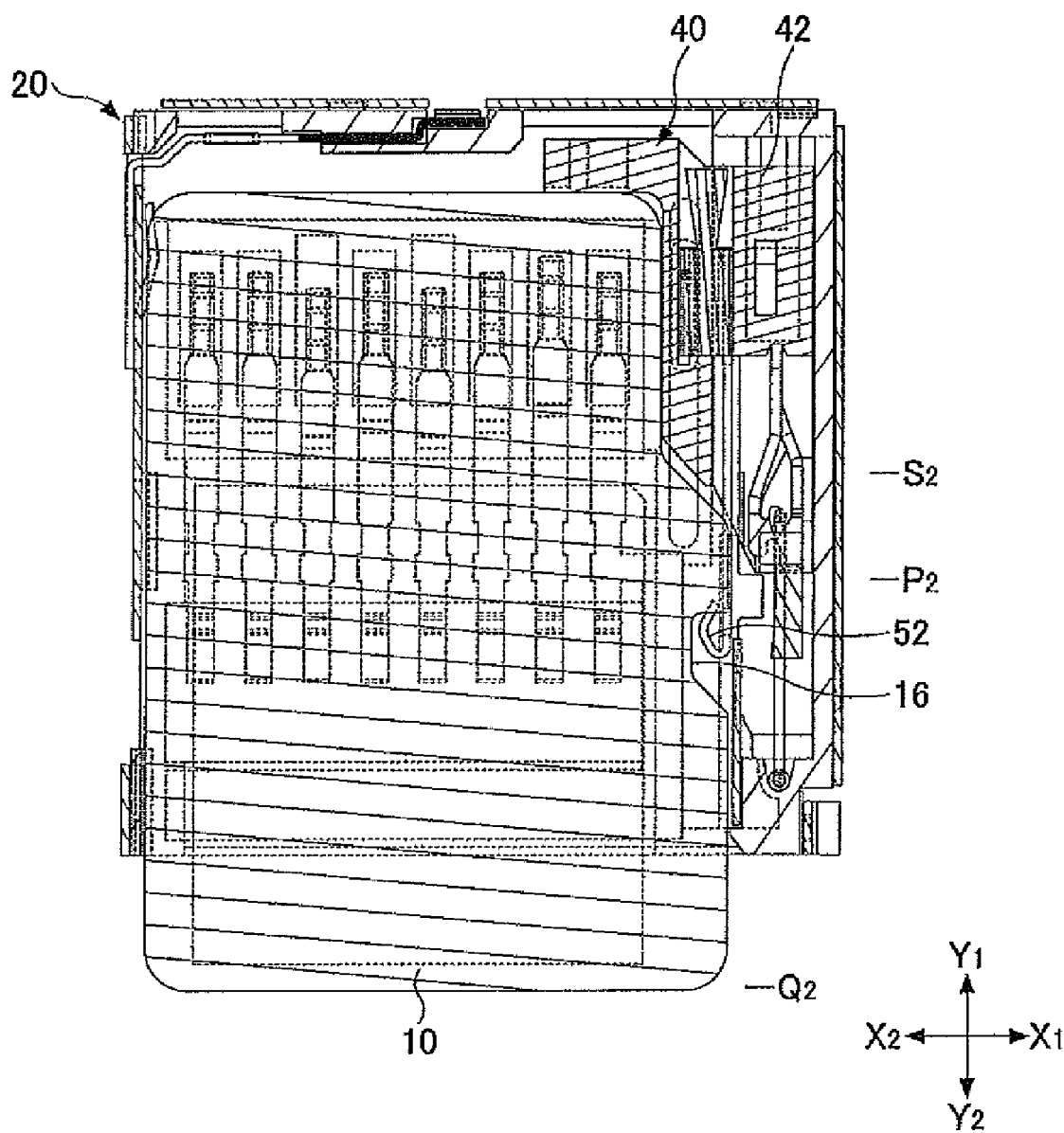
FIG. 5 is a lateral schematic plan view of a card connector in a state where a card is attached to a slider of a card connector according to an embodiment of the present invention.

Then, the card 10 is further pushed in the direction Y1 until the rear end surface 14 reaches the maximum insertion position Q3 as illustrated in FIG. 4B. As the card 10 is pushed in the direction Y1, the slider 40 is moved toward direction Y1 together with the card 10. The compression coil spring 60 is compressed as the slider 40 moves in the direction Y1. The slider 40 moves in the direction Y1 until the end face 40a reaches the maximum insertion position P3, that is, until the overhanging part 43 reaches the position S3. Then, when the card 10 is released from the fingertips of the user, the compression spring 60 causes the slider 40 to move in the direction Y2 and become locked at the card attached position by the heart cam mechanism 65. In this card attached position, the end face 40a is positioned at the position P2 and the overhanging part 43 is positioned at the position S2. In correspondence with the movement of the slider 40, the card 10 is also moved back in the direction Y2. That is, in the case where the slider 40 is in the card attached position, the rear end surface 14 of the card 10 is positioned at the position Q2 (card attached position of the card 10). FIG. 4C and FIG. 5 illustrate the card 10 in a case where the slider 40 is in the card attached position. Where the slider 40 is in the card attached position, the card 10 is locked to the slider 40 by the elastic engagement between the locking part 52 and the concave part 16, and overall locked to the card connector 20. In this position, the array of pads (not illustrated), which are provided at the bottom side of the front end surface 13, contact the array of contacts 23 provided in the housing body 22.

[Card Ejecting Operation]

The operation of ejecting the card 10 from the card connector 20 is performed by having the user slightly push the card 10 further into the card connector 20 in the direction Y1 and then pull the card 10 out from the insertion slot 70 in the direction Y2 with his/her fingertips. FIG. 6 is a schematic diagram for explaining the ejecting of the card 10.

Figure 6A:
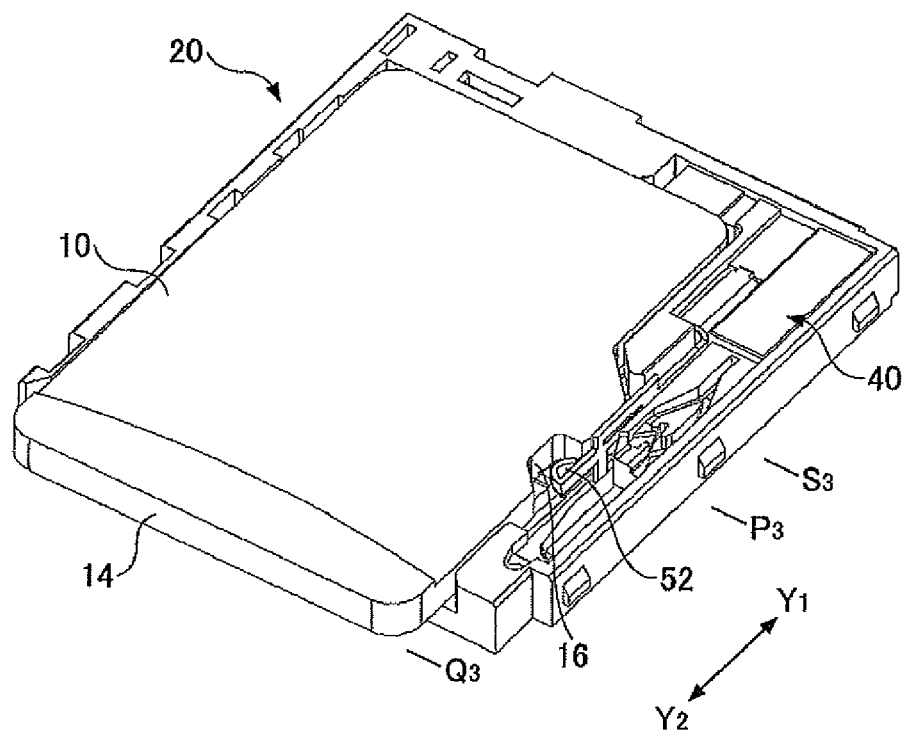
FIGS. 6A-6B are schematic diagrams for explaining an operation of ejecting (detaching) a card according to an embodiment of the present invention.
Figure 6B:
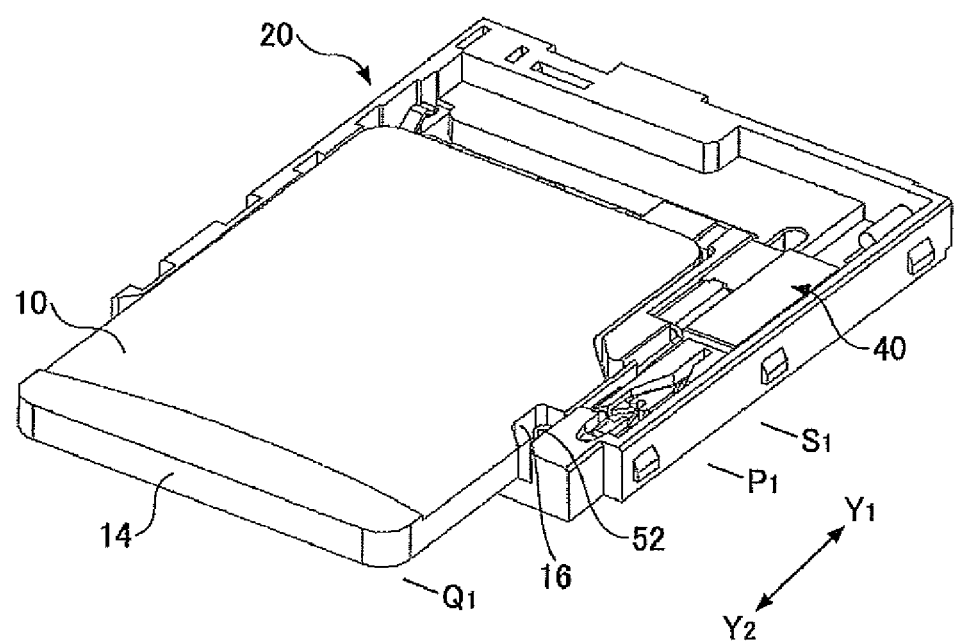

First, as illustrated in FIG. 6A, when the rear end surface 14 of the card 10 is pushed to the position Q3, the end face 40a of the slider 40 moves to the position P3 in the direction Y1. When the end face 40a of the slider 40 is moved to the position P3, the engagement (lock) between the card 10 and the slider 40 by the heart cam mechanism 60 becomes released. Then, by withdrawing the finger in the direction Y2, the urging force (spring force) of the compression coil spring 50 causes the slider 40 to move along the card insertion slot 70 (Y2 direction). Accordingly, the card 10 also moves in the Y2 direction by being pressed by the card receiving part 44 of the slider 40. Thus, in a case where the rear end surface 14 of the card 10 is moved to the position Q1, the slider 40, together with the movement of the card 10, has its end face 40a moved to the position P1 (position in which the end face abuts the upright surface 28) while maintaining the engagement (locked state) between the locking part 52 and the concave part 16 as illustrated in FIG. 6B. That is, the slider 40 has its overhanging part 43 moved to the position S1 while maintaining the engagement (locked state) between the locking part 52 and the concave part 16.

The card 10 is locked to the slider 40 by the elastic engagement between the locking part 52 and the concave part 16. This is the final state where the card 10 is locked to the card connector 20.

Then, by having the user pinch and pull the sides of the rear end surface 14 in the direction Y2, a pushing force in the direction X1 is applied from the concave part 16 to the locking part 52; thereby the leaf spring part 51 is forced to bend and disengage the elastic engagement between the locking part 52 and the concave part 16. Accordingly, the card 10 is pulled out from the card connector 20.

[Configuration for Preventing Permanent Deformation of the Leaf Spring Part 51 Toward the Outer Direction of the Card Installing Part 71 (Direction X1) in a Case where the Card 10 is Inserted in an Irregular Manner]

Figure 17A:
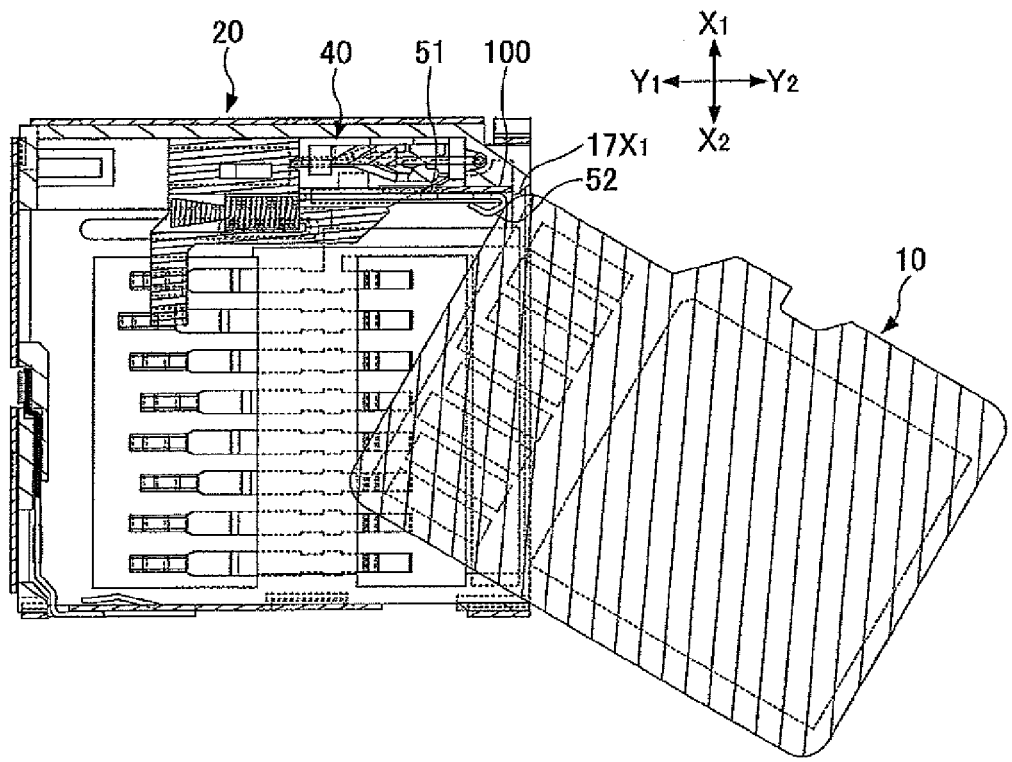
FIGS. 17A-17B are schematic diagrams illustrating a state of a card connector where a card is inserted into the card connector in a slanted manner according to an embodiment of the present invention.

In this embodiment, improperly inserting the card 10 represents the card 10 being inserted into the card connector 20 from an irregular direction. In this embodiment, the irregular direction represents a diagonal (slanted) direction with respect to the center line of the card connector 20 extending in the directions Y1-Y2 as illustrated in FIG. 17A. The insertion of the card 10 from the irregular direction causes the leaf spring part 51 to bend and the locking part 52 to be significantly displaced toward the outer direction of the card installing part 71 (direction X1).

Next, embodiments of a configuration for preventing permanent deformation of the leaf spring part 51 of the leaf spring 50 in a case where the card 10 is improperly inserted are described with reference to FIGS. 7 through 19B.

The card connector 20 includes the below-described first-fourth excess bending preventing structures for preventing the leaf spring part 51 from excessively bending in the case where the card 10 is improperly inserted into the card connector 20.

[First Excess Bending Preventing Structure (Card Insertion Guiding Rail Part 100)]

Figure 7:
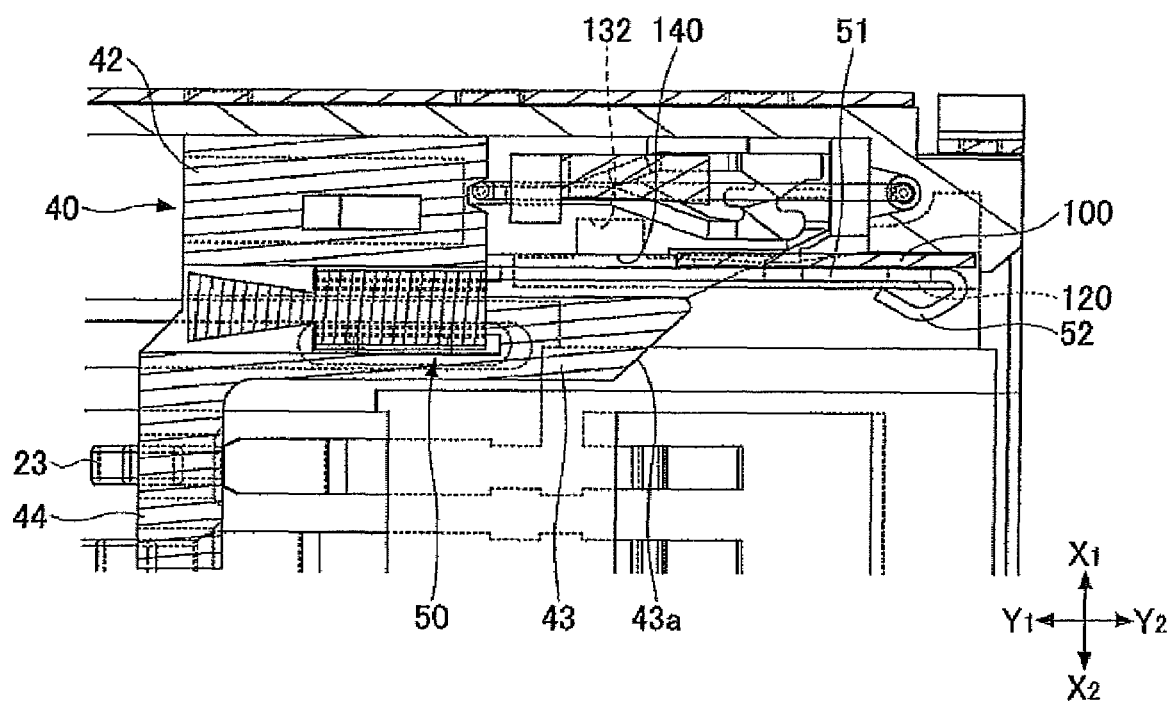
FIG. 7 is an enlarged view illustrating a portion of a card connector surrounded by a circle VII of FIG. 3A.
Figure 8:
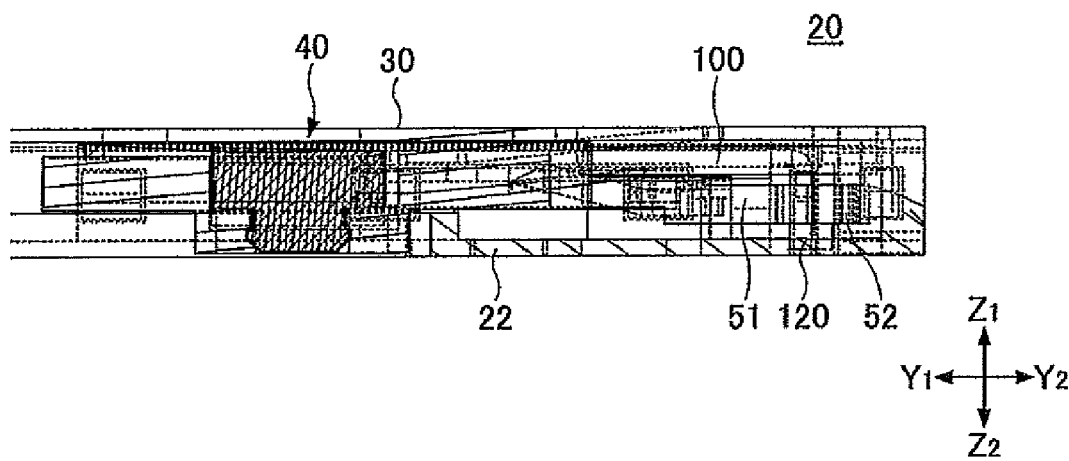
FIG. 8 is an enlarged view illustrating a portion of a card connector surrounded by a circle VIII of FIG. 3B.
Figure 9:
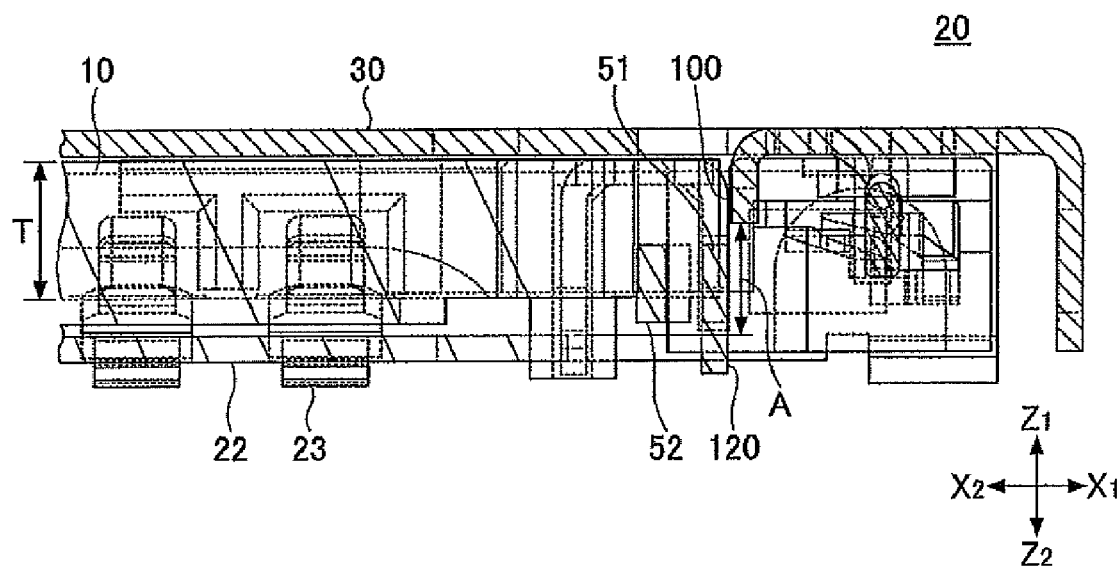
FIG. 9 is an enlarged view illustrating a portion of a card connector surrounded by a circle IX of FIG. 3C.
Figure 13:
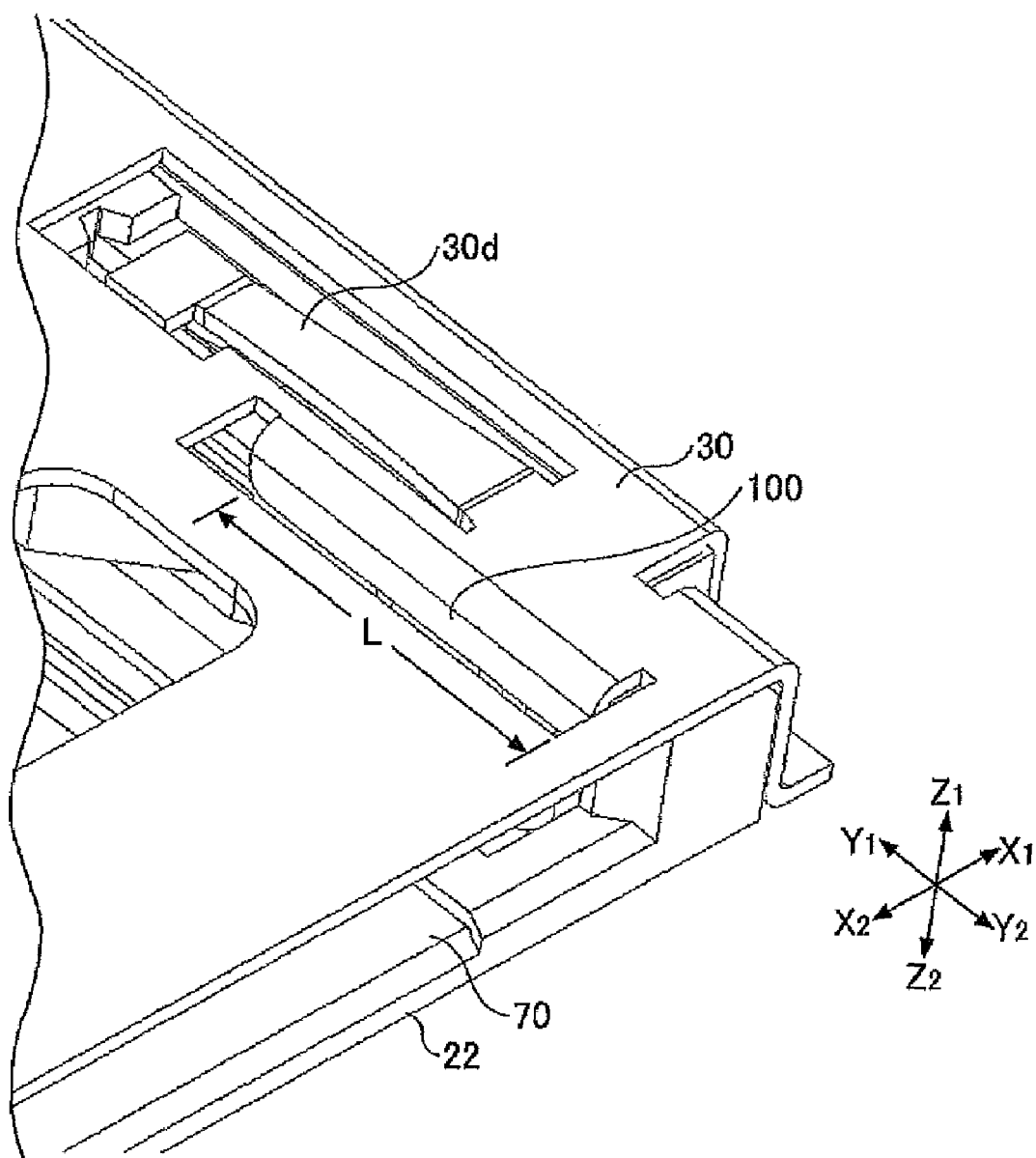
FIG. 13 is an enlarged perspective view illustrating a portion of a card connector in the vicinity of a card insertion slot toward a direction X1 according to an embodiment of the present invention.

As illustrated in FIGS. 7, 9 and 13 (mainly in FIG. 13), the card insertion guiding rail part 100 is formed in a part of the cover 30 toward the direction X1. The card insertion guiding rail part 100 is formed by cutting and bending the part of the cover 30 in the Z2 direction. The card insertion guiding rail part 100 is located more toward the Z1 direction with respect to the leaf spring part 51 where the slider 40 has its end face 40a situated at the position P1. The card insertion guiding rail part 100 extends in the Y1-Y2 directions. The length of the card insertion guiding rail part 100 is illustrated with the letter L in FIG. 13.

Further, as illustrated in FIG. 7, the card insertion guiding rail part 100 is formed extending from a part slightly more toward the direction Y2 than the locking part 52 and extending to a part slightly more toward the direction Y1 than a shoulder part 43a of the overhanging part 43 of the slider body 42 in a case where the end face 40a is located in the position P1.

As illustrated in FIG. 9, the card insertion guiding rail part 100 is located at a position more toward the direction Z1 than the leaf spring part 51 and does not interfere with the leaf spring part 51. With reference to FIG. 9, the card insertion guiding rail part 100 is formed so that the distance "A" between an upper surface part of the housing body 22 and an end of the card insertion guiding part 100 toward the direction Z2 is less than the thickness T of the card 10.

As illustrated in FIG. 17A, even in a case where the card 10 is inserted into the card insertion slot 70 from a diagonal (slanted) direction, the card insertion guiding part 100 receives the corner part 17X1 of the card 10 and prevents the card 10 from pushing the leaf spring part 51 further in the direction X1. Thereby, excess bending of the leaf spring part 51 can be prevented.

[Second Excess Bending Preventing Structure (Projecting Receiver Part 110)]

Figure 11:
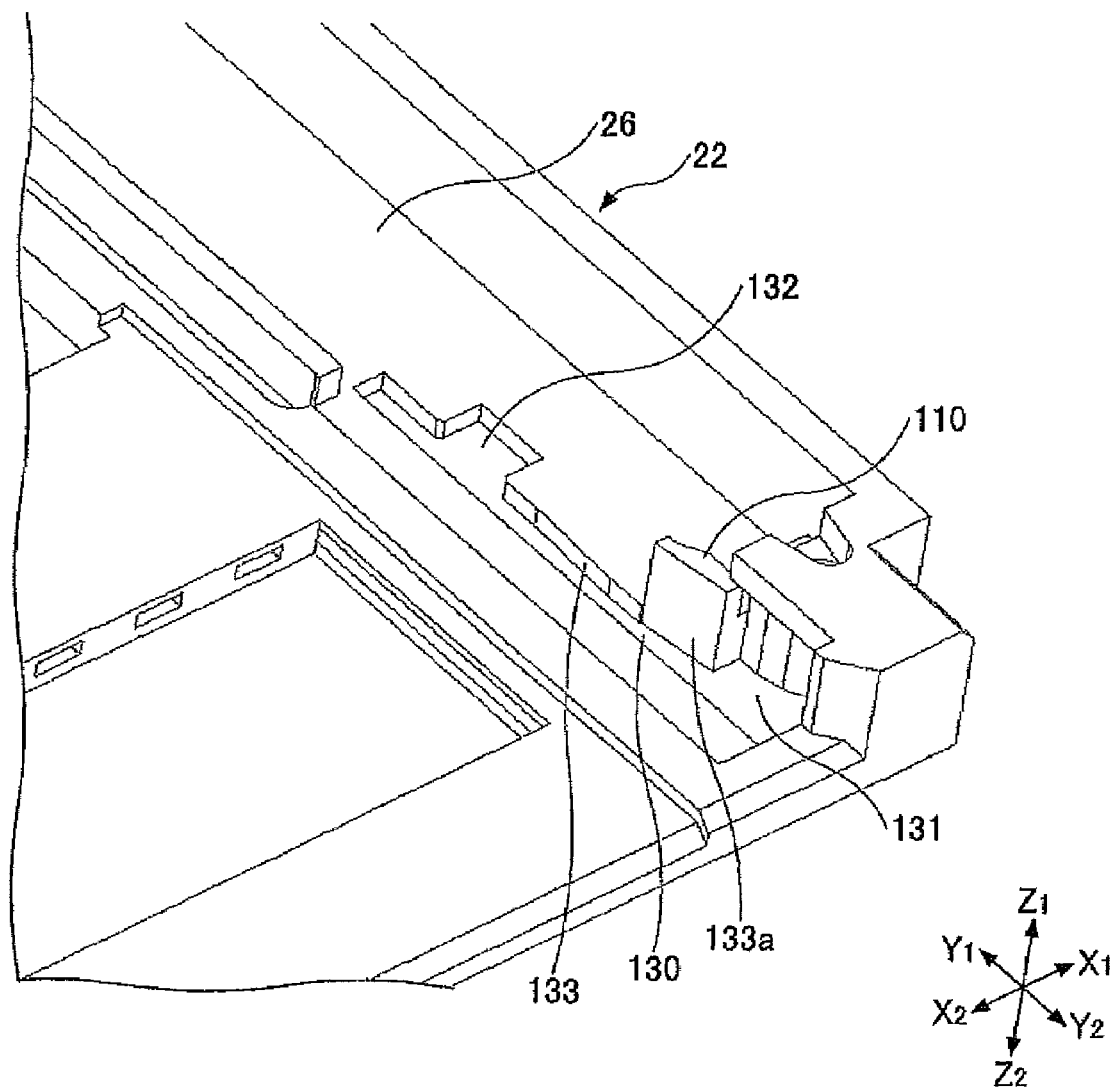
FIG. 11 is a perspective view illustrating a portion of a slider body along which a slider moves according to an embodiment of the present invention.
Figure 12:
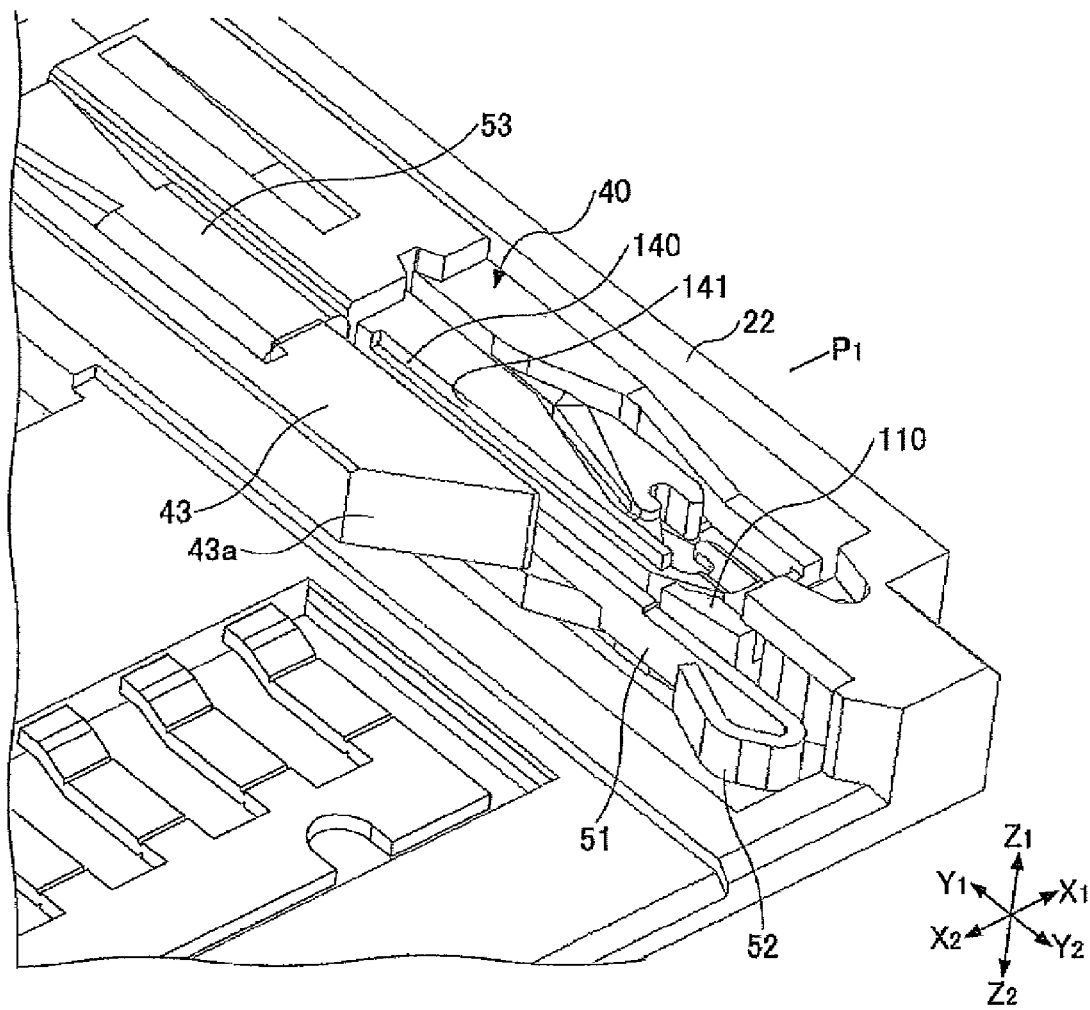
FIG. 12 is a perspective view illustrating the portion of the card connector of FIG. 7.

As illustrated in FIG. 11, a projecting receiver part 110 is formed in a part of the housing body in the vicinity of the card insertion slot 70. In a case where the slider 40 is in the card ejecting position, the projecting receiver part 110 is positioned slightly further in the direction Y1 than the locking part 52. The projecting receiver part 110 is positioned in this manner because the slider 40 is moved slightly in the direction Y1 compared to the card detachment position in a case where the corner part 17X1 of the card 10 is pressed against the locking part 52 when the card 10 is inserted into the card insertion slot 70 in a slanted manner (see FIG. 17B).

In the case where the card 10 is inserted into the card insertion slot 70 in a slanted manner, the locking part 52 may be excessively displaced by the force applied from the corner part 17X1 of the card 10. In this case, the projecting receiver part 110 relieves the excess displacement of the locking part 52 by receiving the locking part 52. Thereby, excess bending of the leaf spring part 51 can be prevented.

[Third Excess Bending Preventing Structure (Lug Part 120 and Slit Part 130)]

Figure 10:
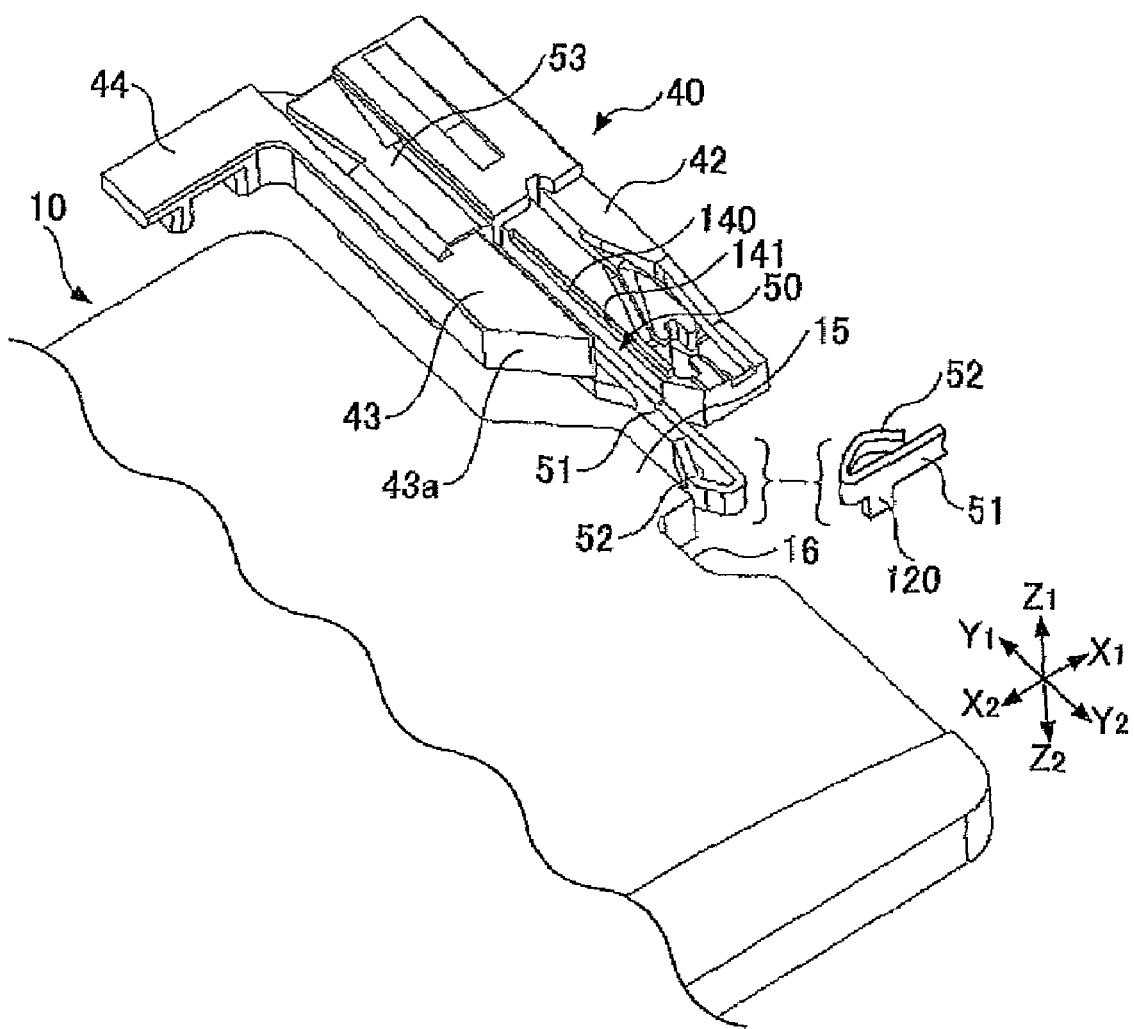
FIG. 10 is a perspective view illustrating a slider in correspondence with a card according to an embodiment of the present invention.

As illustrated in FIG. 10, the leaf spring 50 has a lug part 120 projecting from the leaf spring part 51 in the direction Z2.

As illustrated in FIG. 11, the housing part 22 has a slit part 130 formed extending in the directions Y1, Y2 along a path for allowing the lug part 120 to travel (traveling path).

The slit part 130 has a first concave part 131 formed on its end in the direction Y2 and a second concave part 132 on its other end in the direction Y1. Both the first and second concave parts 131, 132 are widened in the direction X1.

Except at the parts of the first and second concave parts 131, 132, the slit part 130 has a wall 133 in the direction X1 facing an X1 surface of the lug part 120. The wall 133 includes a wall part 133a that corresponds to the projecting receiver part 110.

Figure 19A:
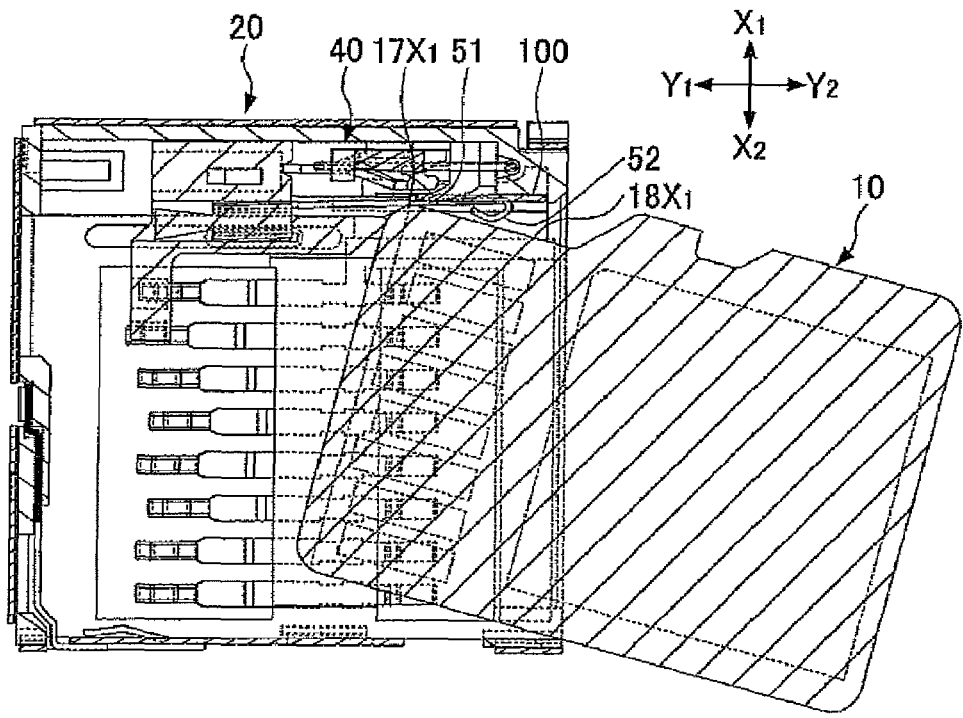
FIGS. 19A-19B are schematic diagrams illustrating a state of a card connector subsequent to the state illustrated in FIG. 18B.
Figure 19B:
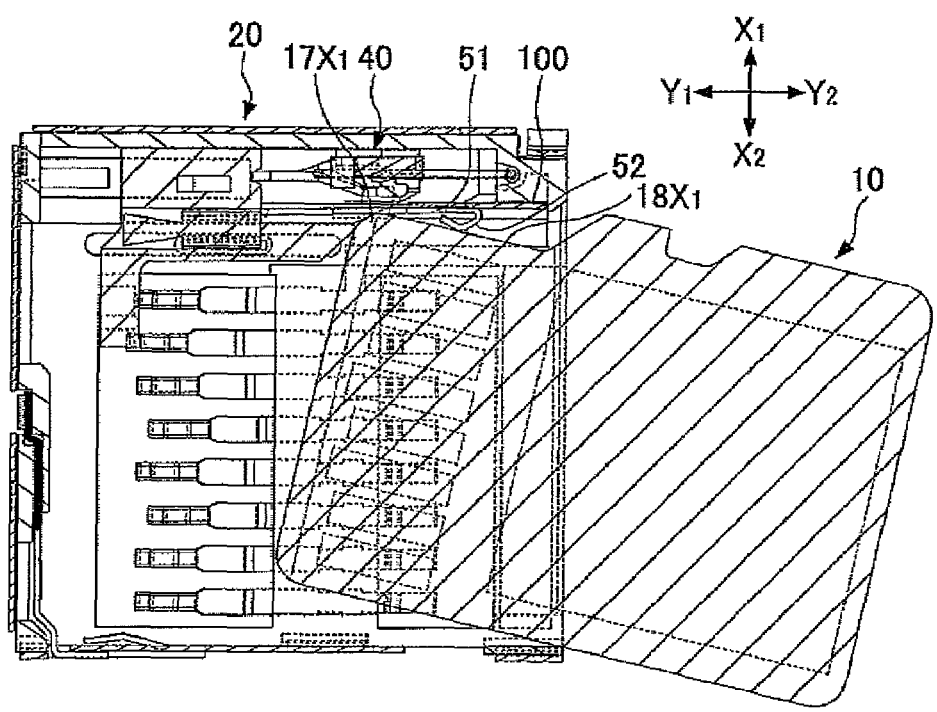

For example, as illustrated in FIG. 19B, when the locking part 52 is excessively displaced in the X1 direction by the force applied from the side surface 18X1 of the card 10 in the case where the card 10 is inserted into the card insertion slot 70 in a slanted manner, the wall 133 of the slit part 130 receives the lug part 120 and prevents the locking part 52 from being further displaced in the direction X1. Thereby, excess bending of the leaf spring part 51 can be prevented.

[Fourth Excess Bending Preventing Structure (Wall 141 of Slider Body 42)]

As illustrated in FIGS. 7, 10, 14, and 27A, the slider 40 has a base part 53 of the leaf spring 50 fixed to the slider body 42. The leaf spring part 51 extends in the Y2 direction from the base part 53. The slider body 42 has a groove part 140 extending in the directions Y1, Y2. The groove part 140 is formed in a size allowing the leaf spring part 51 to be loosely fitted therein. Accordingly, the leaf spring part 51 is installed in the groove part 140. The wall 141 is an inner wall of the slider body 42 located at an X1 side of the groove part 140. The wall 141 faces an X1 surface of the leaf spring part 51.

Figure 17B:
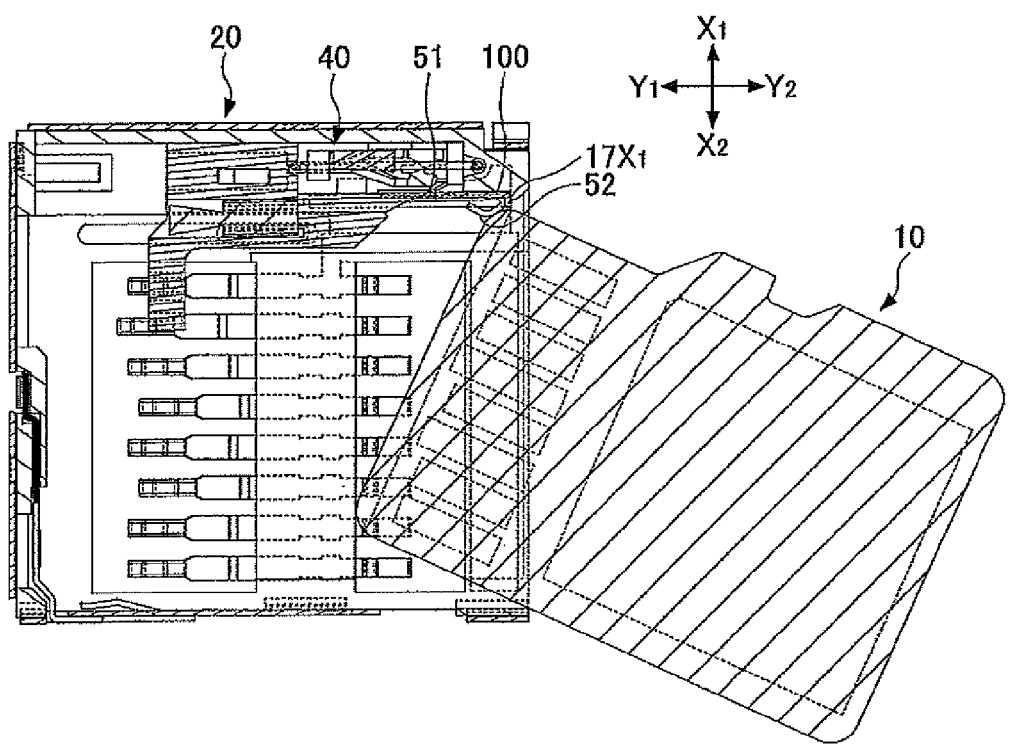

As illustrated in FIG. 17B, when the locking part 52 is excessively displaced in the X1 direction by the force applied from the side surface 18X1 of the card 10 in the case where the card 10 is inserted into the card insertion slot 70 in a slanted manner, the wall 141 receives the leaf spring part 51 and stops further displacement of the leaf spring part 51. Thereby, excess bending of the leaf spring part 51 can be prevented (see FIG. 27B).

Further, the card connector 20 includes a buckling preventing structure. The below-described embodiment of the buckling generation preventing structure prevents the leaf spring 50 from buckling when a compressive force in the axial direction of the leaf spring 50 is applied to the leaf spring 50 in the case where the card 10 is improperly inserted (see FIG. 27B).

[Buckling Preventing Structure (Second Concave Part 132)]

Figure 15:
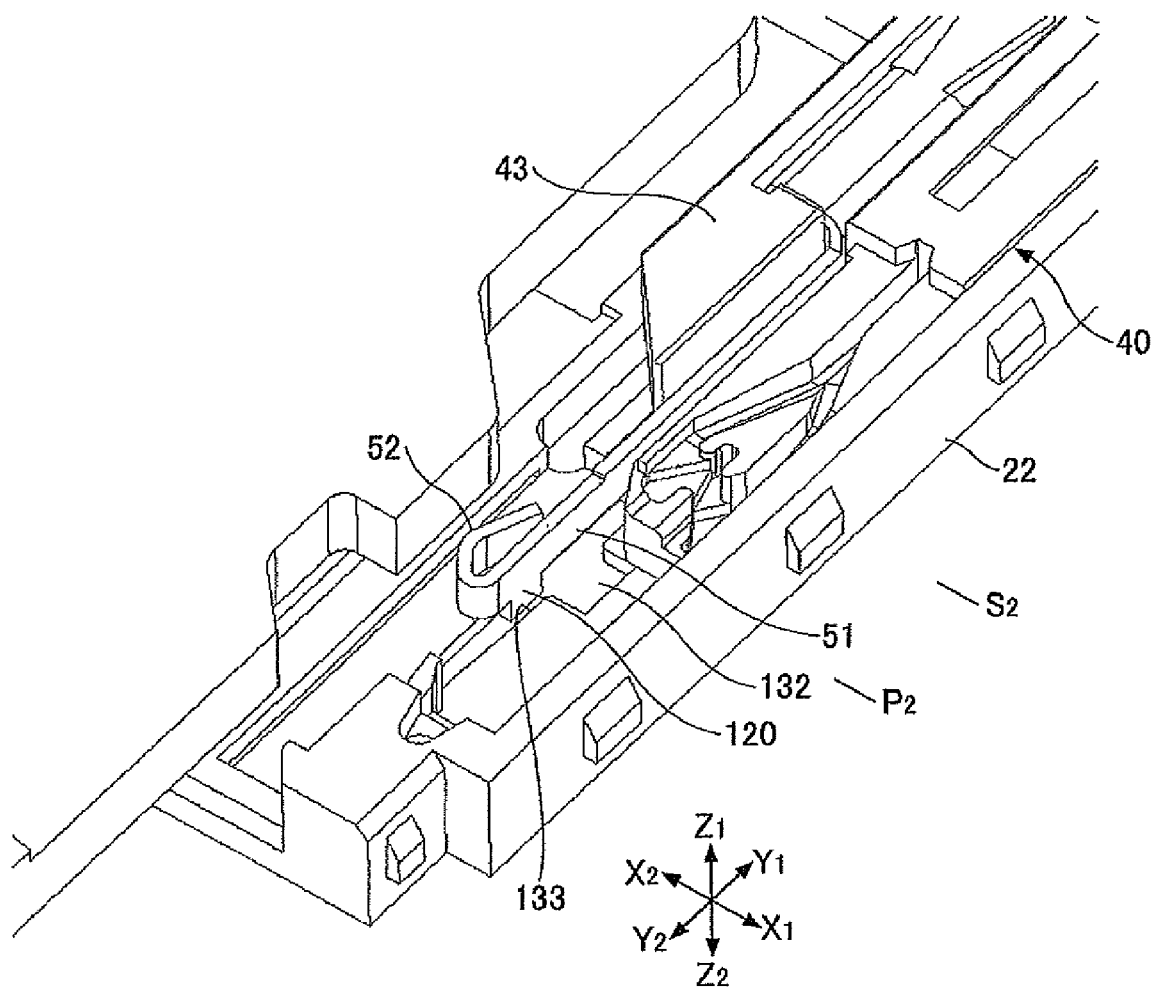
FIG. 15 is another perspective view illustrating a state where a slider is moved to a card attached position according to an embodiment of the present invention.
Figure 16:
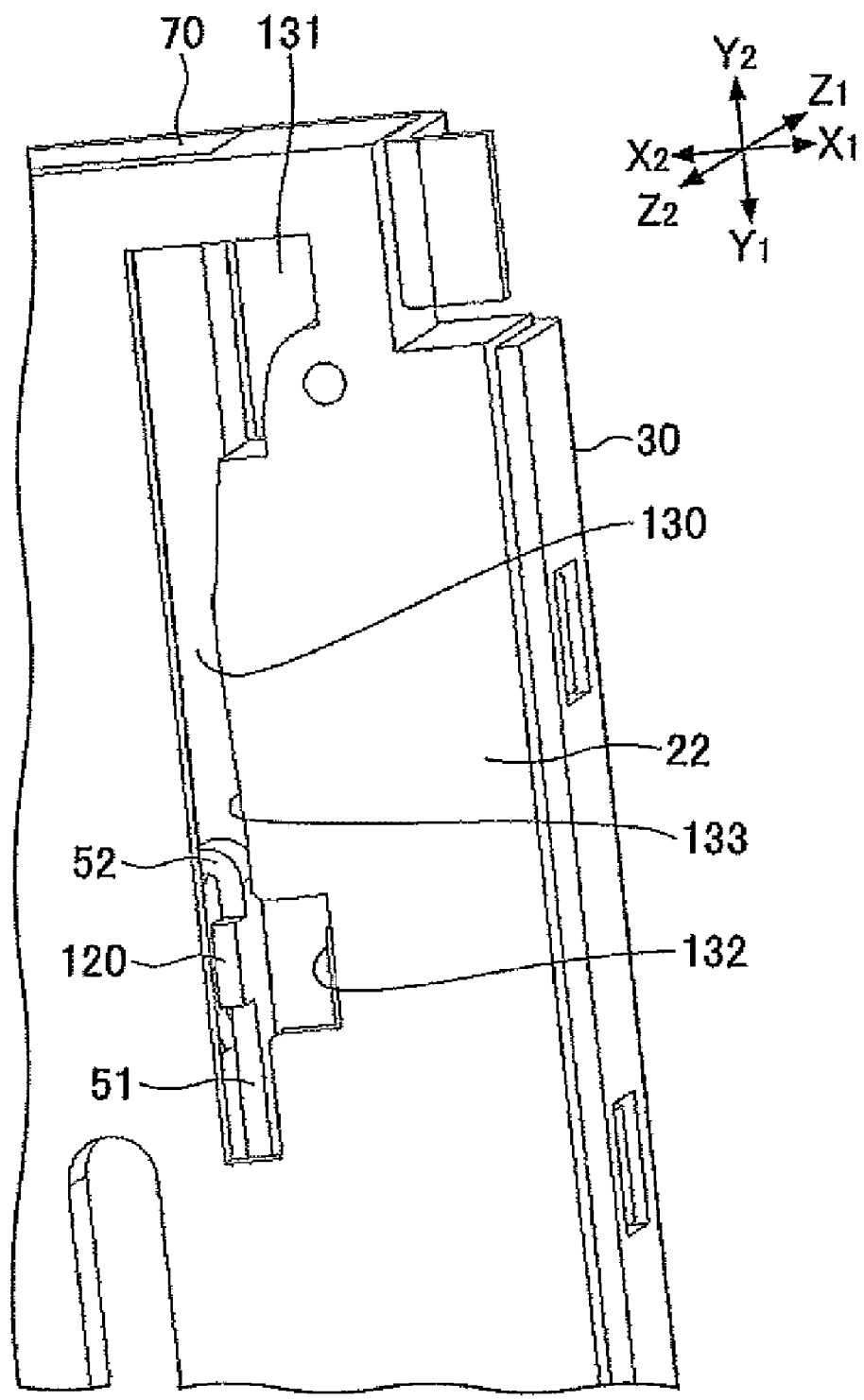
FIG. 16 is a perspective view of a cover when viewed from a bottom side of a card connector in a state where a slider is moved to a maximum insertion position according to an embodiment of the present invention.

As illustrated in FIGS. 11, 15, and 16, the second concave part 132 is formed in the slit part 130 at a position corresponding to the position of the lug part 120 when the slider 40 is in the maximum insertion position P3.

As described below, the slit part 130 is formed to allow the locking part 52 to be displaced in the direction X1 when the card 10 pushes the locking part 52 and causes the slider 40 to move to the maximum insertion position (position where the end face 40a is in position P3) in the case where the card 10 is improperly inserted. By allowing the locking part 52 to be displaced toward the direction X1, the leaf spring part 51 can be prevented from buckling (see FIG. 27B).

[Operation of Excess Bending Preventing Structure and Buckling Preventing Structure]

Next, an operation is described of the excess bending preventing structure and the buckling preventing structure for preventing permanent deformation of the leaf spring part 51 where the card 10 is improperly inserted.

<First Embodiment where the Card 10 is Improperly Inserted>

Because the width W3 of the card insertion slot 70 of the card connector 20 is greater than the width W1 of the front end surface 13 of the card 10, the card 10 is liable to be inserted in a slanted manner as illustrated in FIG. 17A. This manner of insertion is hereinafter also referred to as "slanted insertion".

In a case where the user performs the slanted insertion as illustrated in FIG. 17A, the card 10 is attached to the card connector 20 by going through the positions illustrated in FIGS. 17B through 20B.

Figure 18A:
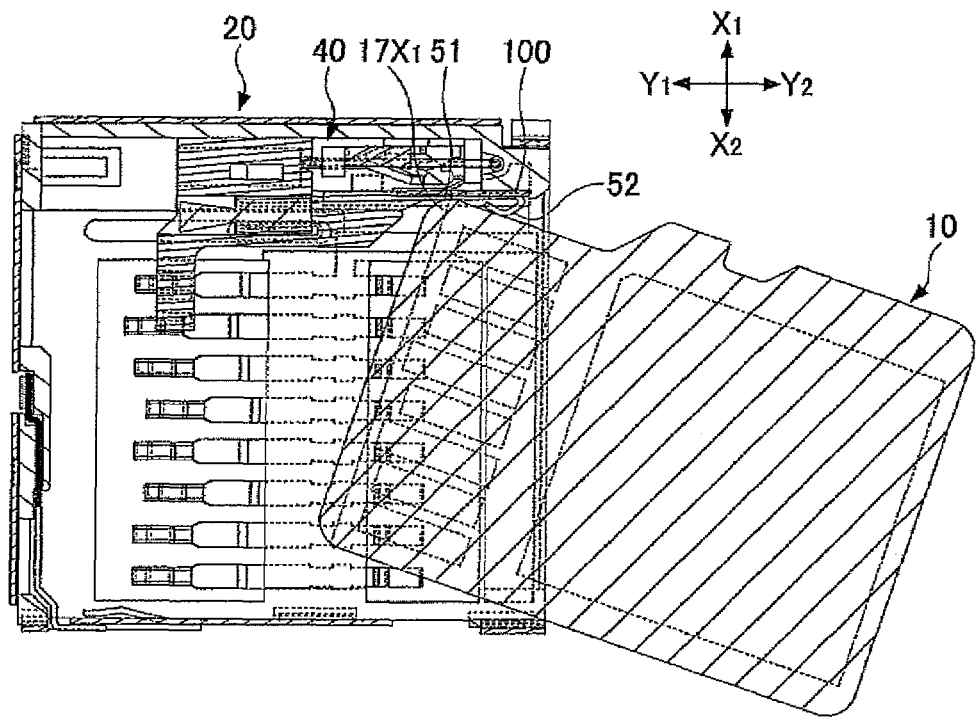
FIGS. 18A-18B are schematic diagrams illustrating a state of a card connector subsequent to the state illustrated in FIG. 17B.
Figure 18B:
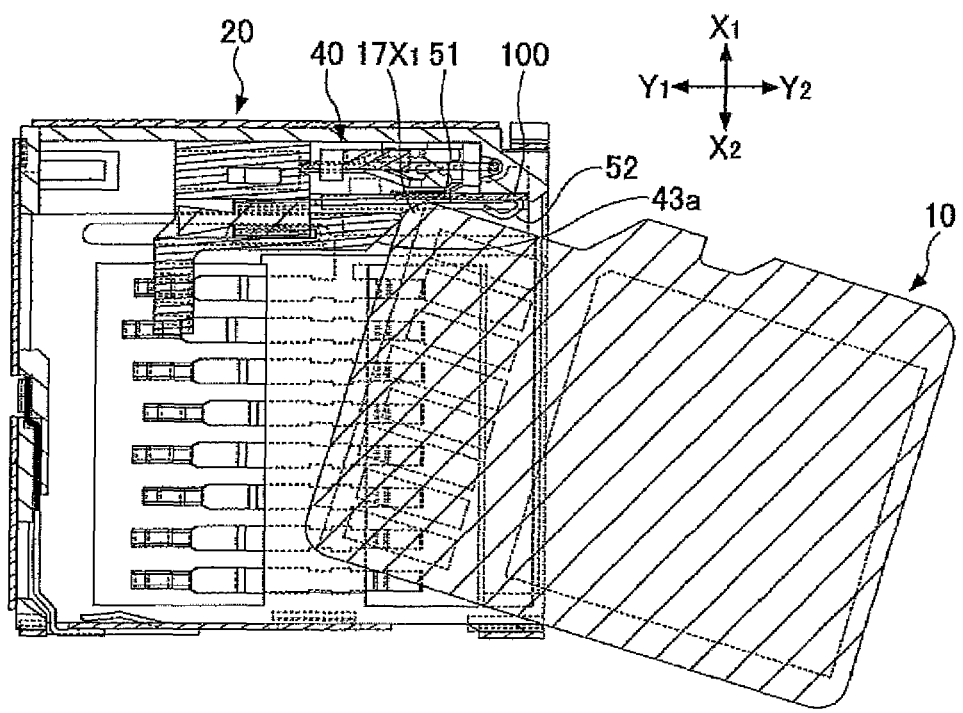

As illustrated in FIG. 17B, the card insertion guiding rail part 100 receives the corner part 17X1 of the card 10. Once the corner part 17X1 is received by the card insertion guiding rail part 100, the card insertion guiding rail part 100 guides the corner part 17X1 as the card 10 is inserted further into the card connector 20 as illustrated in FIG. 18A. Once the corner part 17X1 reaches the shoulder part 43a, the corner part 17X1 pushes the slider 40 in the direction Y1 while sliding along the shoulder part 43a until the slider 40 reaches the maximum insertion position (position where the end face 40a is in position P3) as illustrated in FIGS. 19A, 19B, 20A and FIG. 20B, to thereby attach the card 10 to the card connector 20 as illustrated in FIG. 5.

When the card 10 is inserted in a slanted manner, there may be a case where the card 10 cannot be inserted any further into the card connector 20 due to the corner part 17X1 engaging the shoulder part 43. In this case where the attachment operation ends in failure, the user pulls the card 10 out from the card connector 20 and reattempts to attach the card 10 to the card connector 20

In a case where the card 10 is inserted in the above-described manner, the first-fourth excess bending preventing structures operate in correspondence with the manner in which the card 10 is inserted into the card connector 20.

[Operation of First Excess Bending Preventing Structure]

Figure 21A:
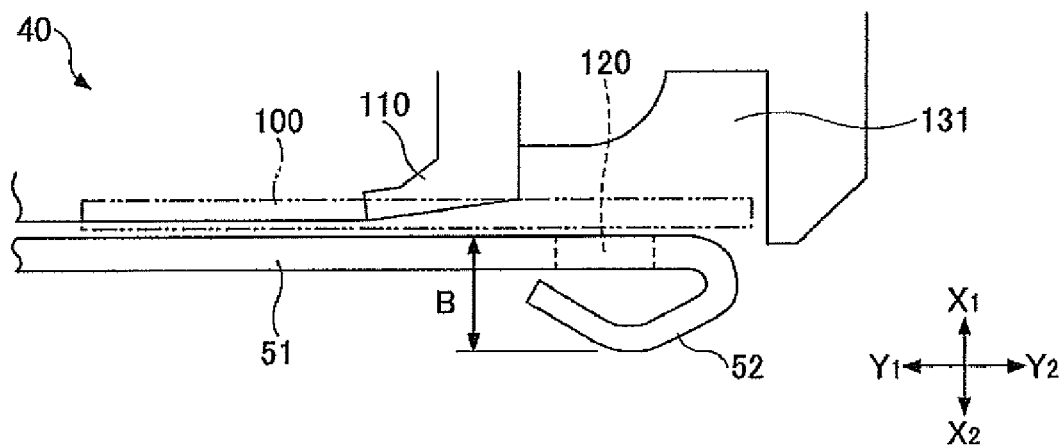
FIGS. 21A and 21B are schematic diagrams for describing a first excess bending preventing structure and deformation of a leaf spring part when a strong force is applied to a locking part in a direction X1 in a case where a slider is in a card ejected position according to an embodiment of the present invention.
Figure 21B:
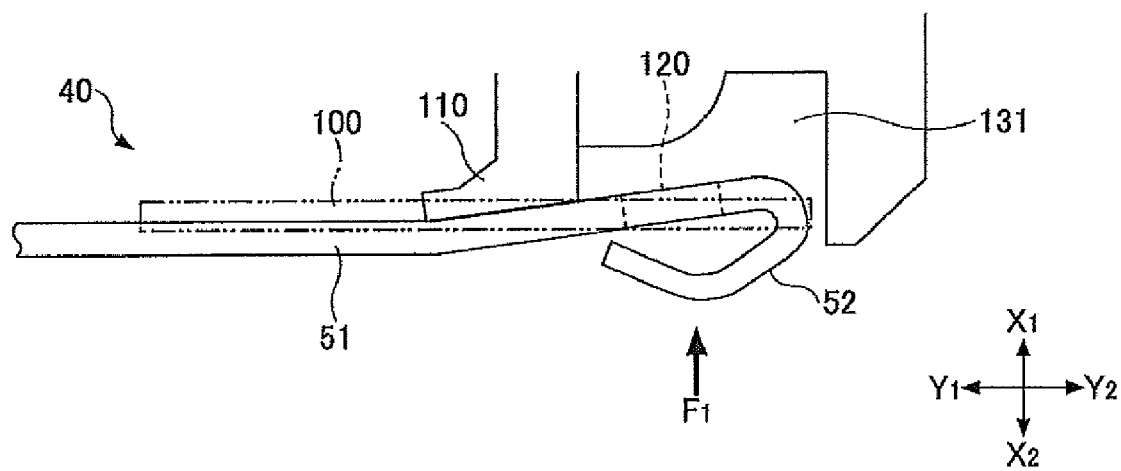

FIGS. 21A and 21B are schematic diagrams for describing deformation of the leaf spring part 51 when a strong force F1 is applied to the locking part 52 in the direction X1 in a case where the slider 40 is in the card ejecting position (position where the end face 40a is in the position P1). The deformation occurs, for example, when the locking part 52 is pressed by the corner part 17X1 in a case where the card 10 is inserted in a slanted manner.

FIG. 21A illustrates an initial state of the locking part 52. The displacement of the corner part 17X1 in the direction X1 is restrained to the position where the corner part 17X1 contacts the card insertion guiding rail part 100. Therefore, the amount in which the leaf spring part 51 bends in the direction X1 is limited to substantially the distance B in which the locking part 52 projects from the card insertion guiding rail part 100 in the initial state. The bending of the leaf spring part 51 in the vicinity of the locking part 52 is no greater than the elastic limit (limit of elasticity) of the leaf spring part 51. The leaf spring part 51 returns to its initial straight shape when the applying of force F1 is terminated. In the case where the force F1 is applied to the locking part 52, the locking part 52 and the lug part 120 are displaced in the direction X1 and enter the first concave part 131.

Figure 20A:
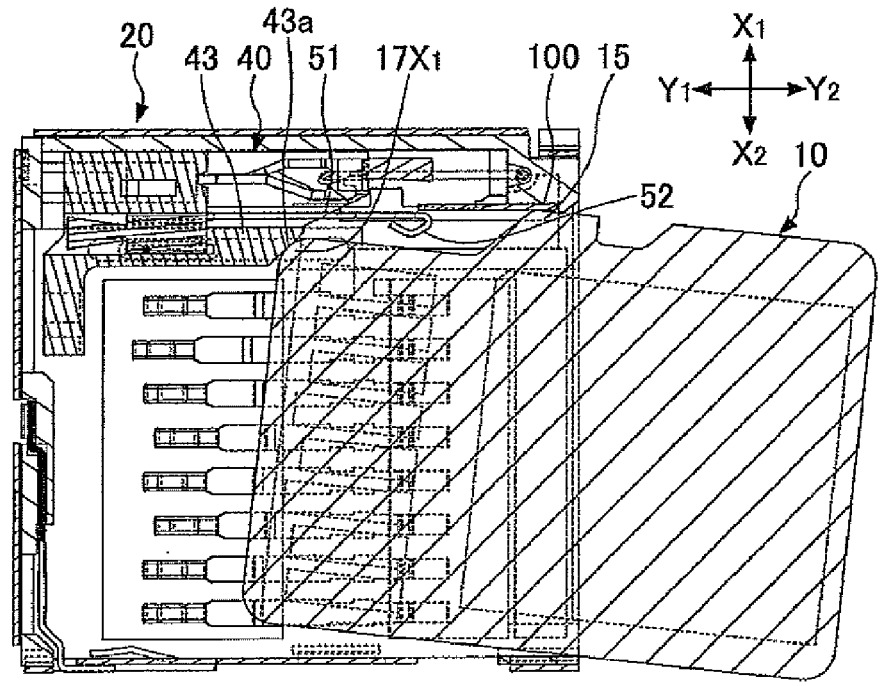
FIGS. 20A-20B are schematic diagrams illustrating a state of a card connector subsequent to the state illustrated in FIG. 19B.
Figure 20B:
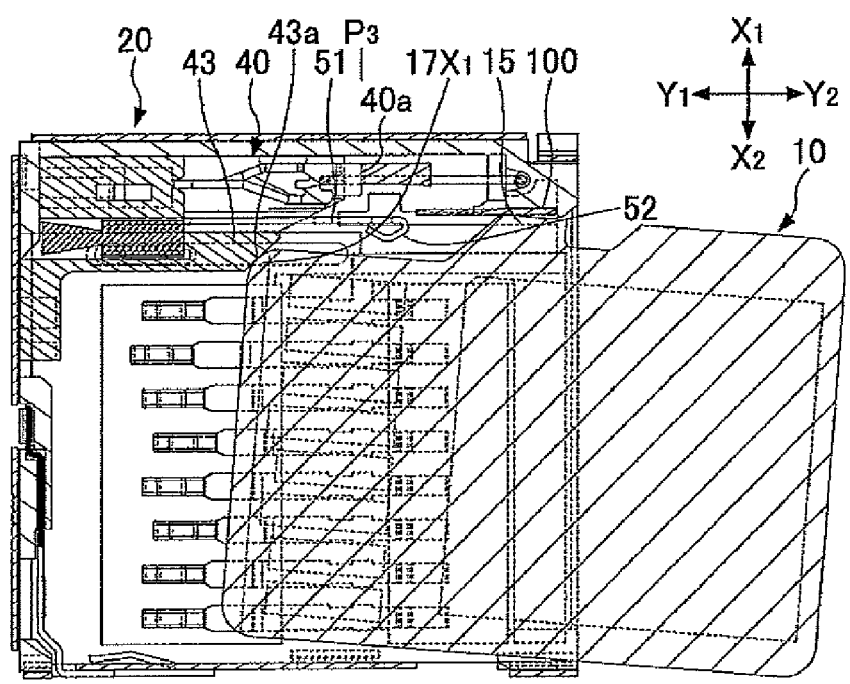

Further, as illustrated in FIGS. 19A and 20A, the card insertion guiding rail part 100 also serves to guide the corner part 17X1 and the convex part 15 of the card 10.

[Operation of Second Excess Bending Preventing Structure]

Figure 22A:
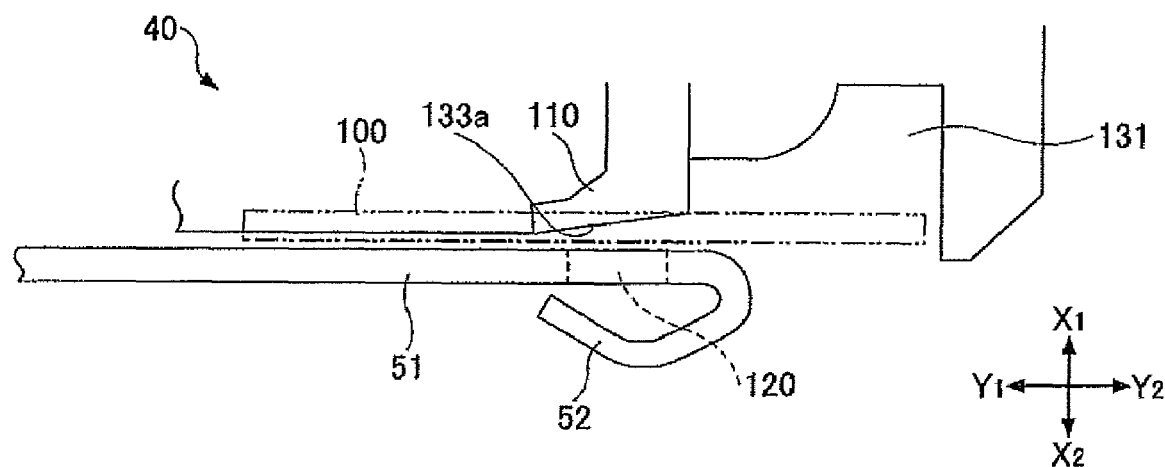
FIGS. 22A and 22B are schematic diagrams for describing a second excess bending preventing structure and deformation of a leaf spring part when a strong force is applied to a locking part in a direction X1 in a case where a slider is slightly moved more toward a direction Y1 than a card ejected position according to an embodiment of the present invention.
Figure 22B:
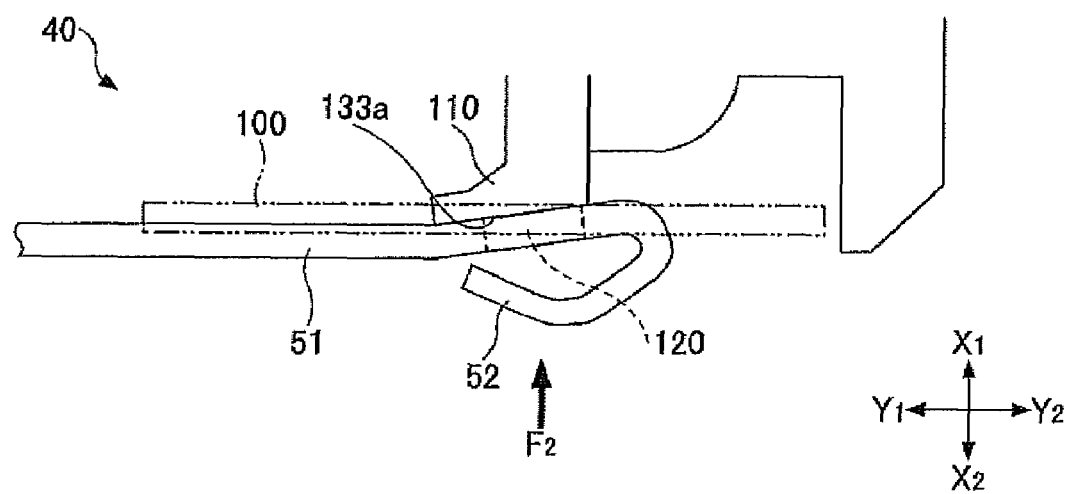

FIGS. 22A and 22B are schematic diagrams for describing deformation of the leaf spring part 51 when a strong force F2 is applied to the locking part 52 in the direction X1 in a case where the slider 40 is slightly moved more toward the direction Y1 than the card ejecting position (position where the end face 40a is in the position P1). The deformation may occur immediately after slanted insertion of the card 10. For example, the deformation occurs between the state illustrated in FIG. 17B and the state illustrated in FIG. 18A.

FIG. 22A illustrates the leaf spring part 51 before the leaf spring part 51 is bent. As illustrated in FIG. 22B, the displacement of the locking part 52 in the direction X1 is restrained by having the projecting receiver part 110 receive the locking part 52 while at substantially the same time having the wall part 133a receive the lug part 120. Therefore, the leaf spring part 51 can be restrained from bending in the direction X1. As illustrated in FIG. 22B, the bending of the leaf spring part 51 is no greater than the elastic limit (limit of elasticity) of the leaf spring part 51. The leaf spring part 51 returns to its initial straight shape when the applying of force F2 is terminated.

[Operation of Third Excess Bending Preventing Structure]

Figure 23A:
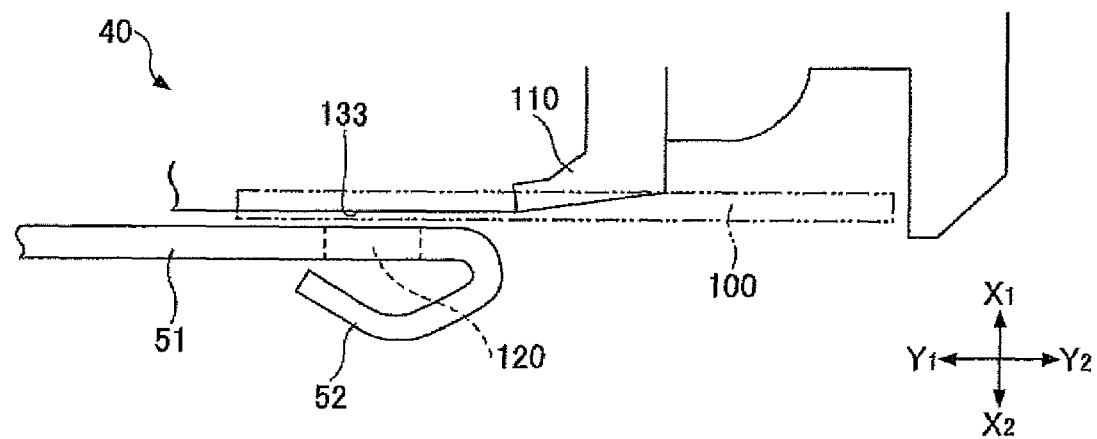
FIGS. 23A and 23B are schematic diagrams for describing a third excess bending preventing structure and deformation of a leaf spring part when a strong force is applied to a locking part in a direction X1 in a case where a slider is further moved more toward a direction Y1 than the position illustrated in FIGS. 22A-22B according to an embodiment of the present invention.
Figure 23B:
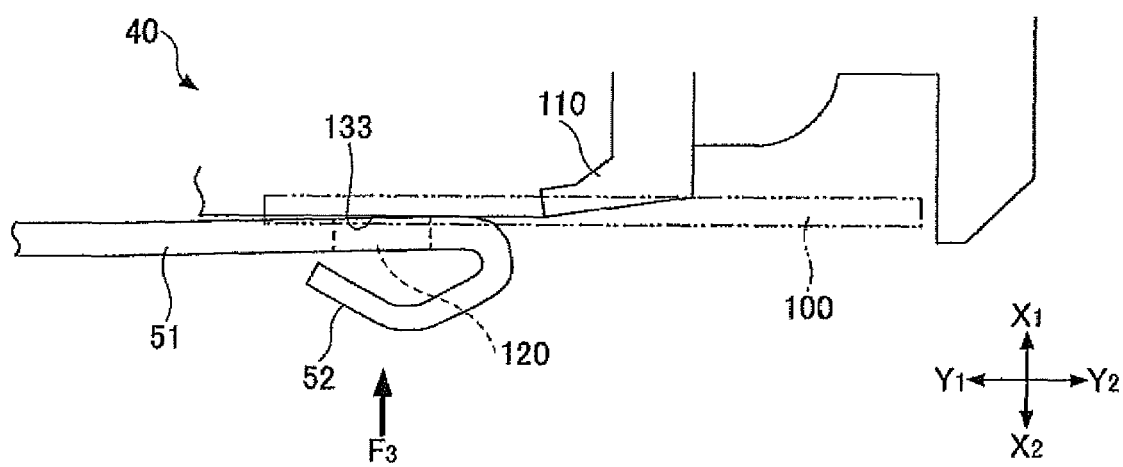

FIGS. 23A and 23B are schematic diagrams for describing deformation of the leaf spring part 51 when a strong force F3 is applied to the locking part 52 in the direction X1 in a case where the slider 40 is further moved more toward the direction Y1 than its position illustrated in FIGS. 22A and 22B. The deformation may occur during slanted insertion of the card 10. For example, the deformation occurs during the insertion illustrated in FIG. 19B.

FIG. 23A illustrates the leaf spring part 51 before the leaf spring part 51 is bent. As illustrated in FIG. 23B, the displacement of the locking part 52 in the direction X1 is restrained by having the wall 133 receive the lug part 120. Therefore, the leaf spring part 51 can be restrained from bending in the direction X1. As illustrated in FIG. 23B, the bending of the leaf spring part 51 is no greater than the elastic limit (limit of elasticity) of the leaf spring part 51. The leaf spring part 51 returns to its initial straight shape when the applying of force F3 is terminated.

Further, since the displacement of the locking part 52 in the direction X1 is restrained, the locking part 52 can remain engaged with the concave part 16 of the card 10.

[Operation of Fourth Excess Bending Preventing Structure]

Figure 24A:
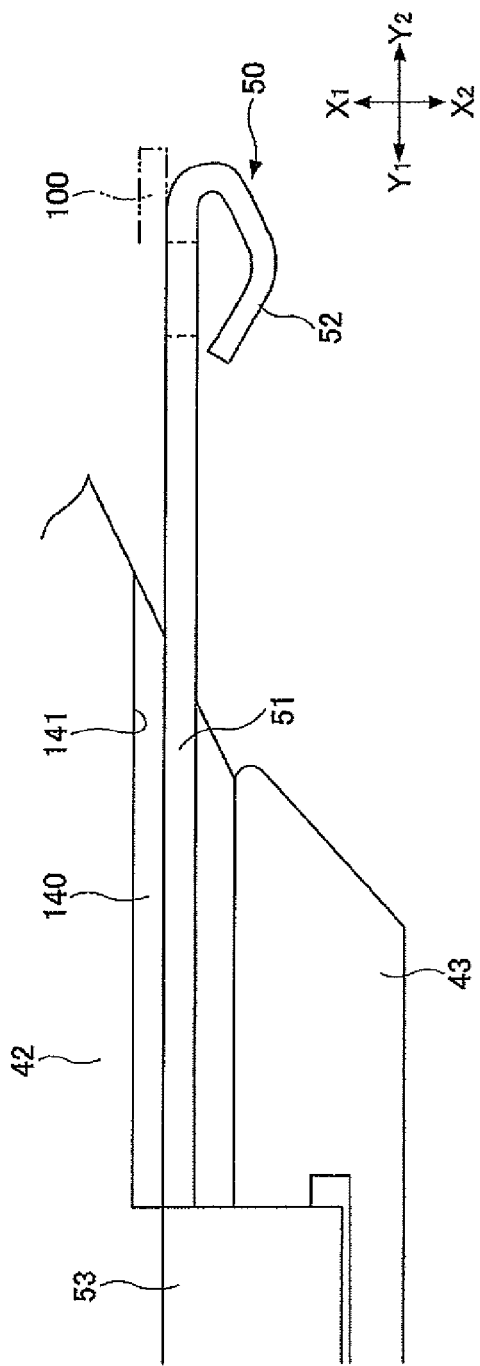
FIGS. 24A and 24B are schematic diagrams for describing a fourth excess bending preventing structure and deformation of a leaf spring part in a case where a force F4 is applied to a locking part in a direction X1 according to an embodiment of the present invention.
Figure 24B:
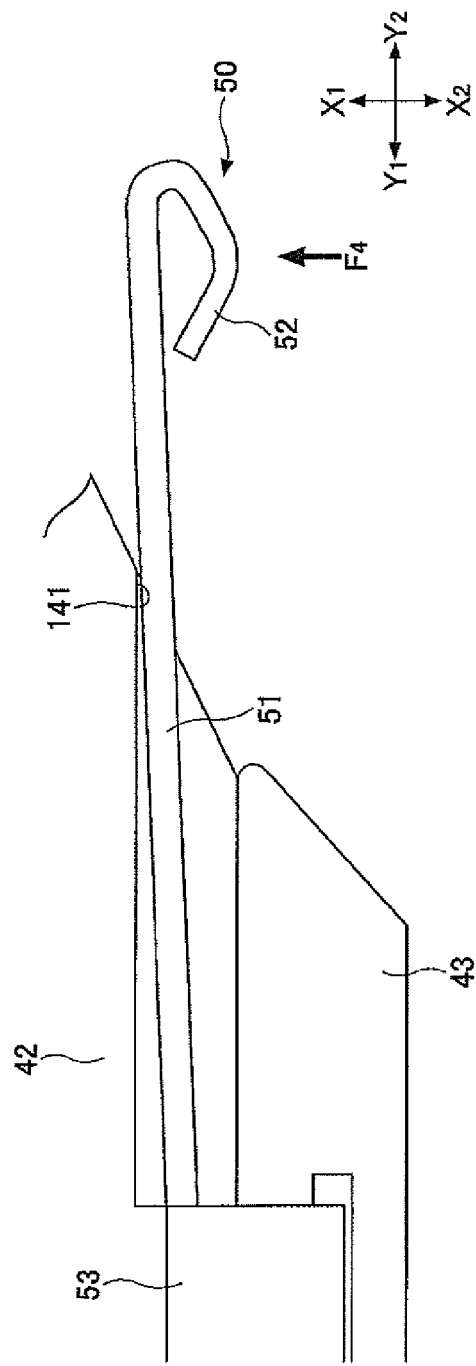

FIG. 24A is another schematic diagram illustrating the leaf spring 50 before the leaf spring part 51 is bent. In a case where a force F4 is applied to the locking part 52 in the direction X1, the leaf spring part 51 is bent as illustrated in FIG. 24B. In the vicinity of the outer part of the groove part 140 in the Y2 direction, the leaf spring part 51 is restrained from bending further in the direction X1 by abutting the wall 141 of the slider body 42. As illustrated in FIG. 24B, the bending of the leaf spring part 51 is no greater than the elastic limit (limit of elasticity) of the leaf spring part 51. The leaf spring part 51 returns to its initial straight shape when the applying of force F4 is terminated.

[Relationship between the Insertion of the Card 10 and the First-Fourth Excess Bending Preventing Structures]

Next, the relationship between the insertion of the card 10 and the first-fourth excess bending preventing structures are described.

In a case where the card 10 is inserted as illustrated in FIG. 17B, the second excess bending preventing structure (e.g., projecting receiver part 110) provides a function for preventing excessive bending of the leaf spring part 51 (excess bending preventing function).

In a case where the card 10 is positioned as illustrated in FIG. 18A, the first and fourth excess bending preventing structures (e.g., card insertion guiding rail part 100 and wall 141) also begin to provide the excess bending preventing function. Thus, as illustrated in FIG. 18A, the first, second, and fourth excess bending preventing structures provide the excess bending preventing function. The first, second, and fourth excess bending preventing structures continue to provide the excess bending preventing function even in the state illustrated in FIG. 19A.

In a case where the card 10 is positioned as illustrated in FIG. 19B, the third and fourth excess bending preventing structures (e.g., lug part 120, slit part 130, and wall 141) provide the excess bending preventing function.

In a case where the card 10 is positioned as illustrated in FIG. 20A, the first excess bending preventing structure (e.g., card insertion guiding rail part 100) provides the excess bending preventing function. The first excess bending preventing structure continues to provide the excess bending preventing function even in the state illustrated in FIG. 20B.

<Second Embodiment where the Card 10 is Improperly Inserted>

Figure 25A:
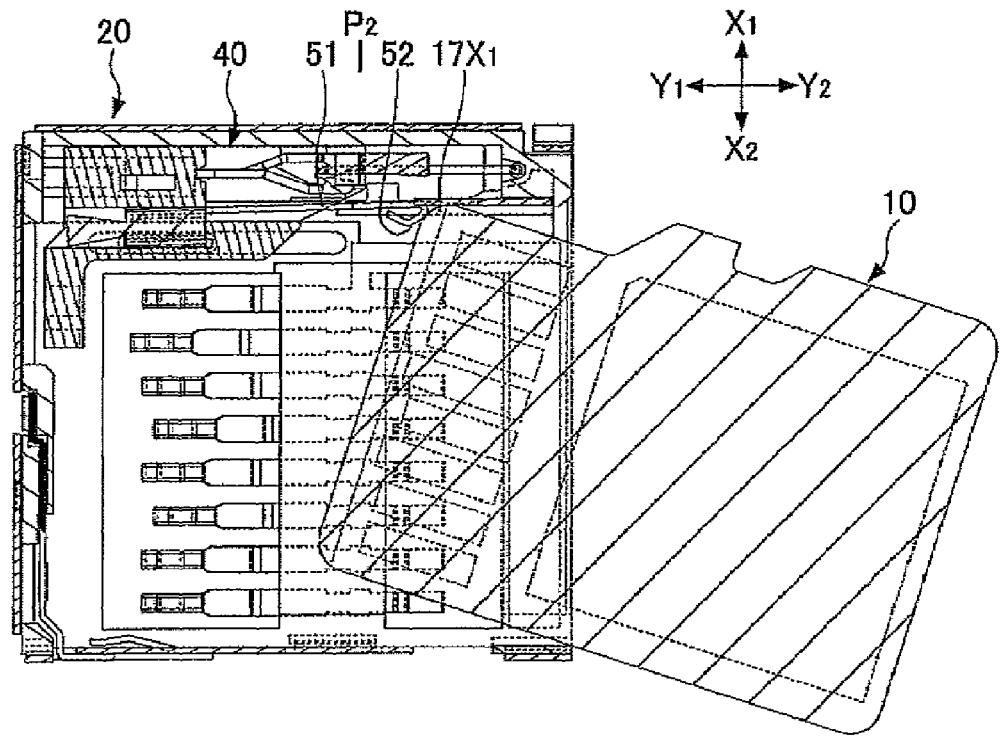
FIGS. 25A and 25B are schematic diagrams illustrating a state of a card connector where a card is inserted into the card connector in a slanted manner according to another embodiment of the present invention.
Figure 25B:
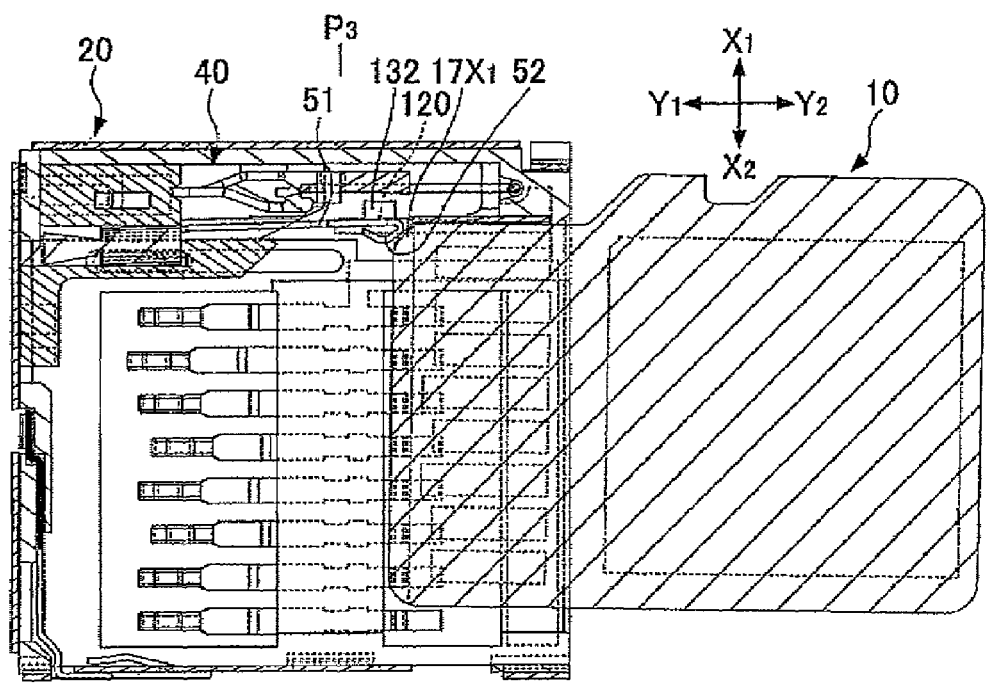
Figure 26:
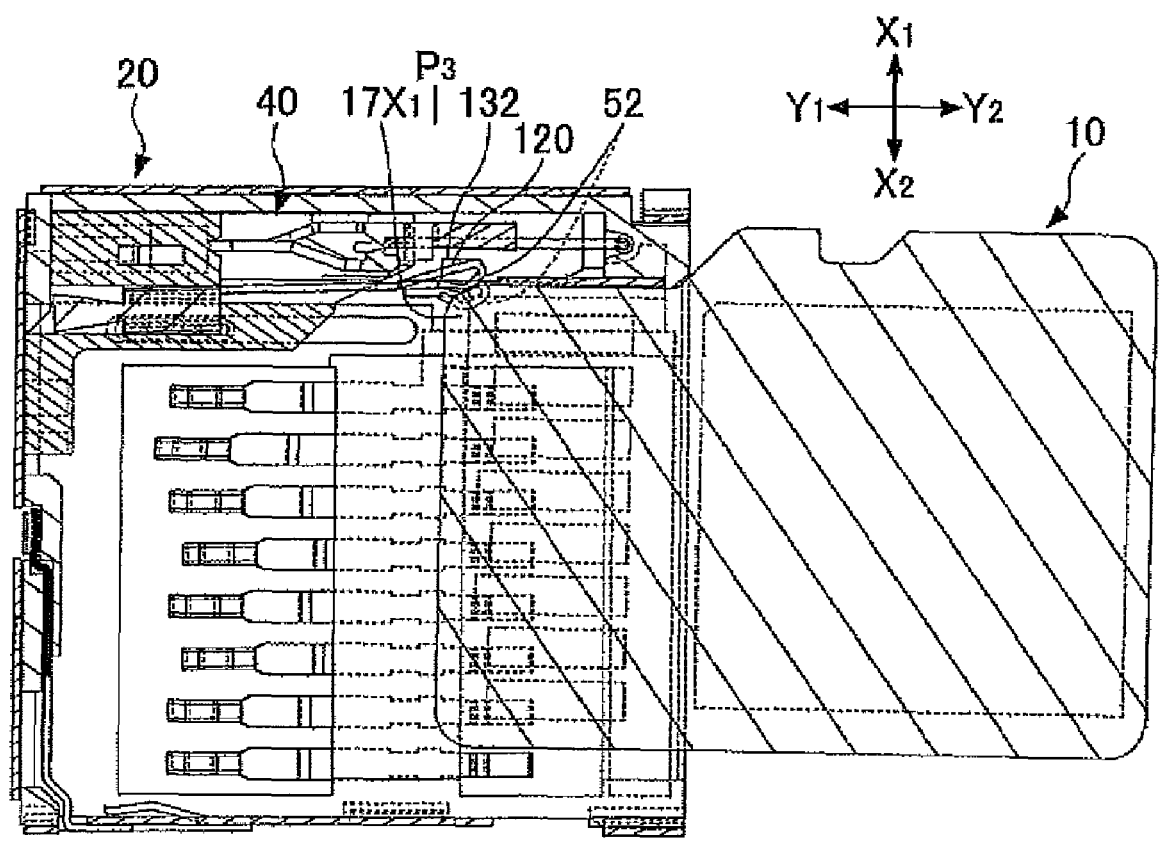
FIG. 26 is a schematic diagram illustrating a card connector subsequent to the state illustrated in FIG. 25B.

In a case where the card 10 is improperly inserted, the corner part 17X1 of the card 10 travels along the card insertion guiding rail part 100 without overriding the locking part 52 and pushes the locking part 52 in the Y1 direction as illustrated in FIG. 25A. After the card 10 has its orientation adjusted and positioned toward the direction X1 as illustrated in FIG. 25B, the slider 40 is moved from the card attached position (position where the end face 40a is in position P2) to the maximum insertion position (position where the end face 40a is in the position P3) as illustrated in FIG. 25B and has a pressing force applied in the direction Y1 by the card 10 as illustrated in FIG. 26.

Further, in a case where the card 10 is inserted in a slanted manner as illustrated in FIGS. 17A-19B, the slider 40 may be locked in the card attached position. Thus, when the card 10 is re-inserted in a slanted manner, the slider 40 is positioned as illustrated in FIG. 25A.

In the case where the card 10 is inserted in the manner illustrated in FIG. 25A, the first excess bending preventing structure, the third excess bending preventing structure, and the fourth excess bending preventing structure provide the excess bending preventing function. When the slider 40 is in the position illustrated in FIGS. 25B and 26, the buckling preventing structure (e.g., second concave part 132) provides a function for preventing buckling of the leaf spring part 51 (buckling preventing function).

[Operation of Buckling Preventing Structure]

Next, an operation of a buckling preventing structure is described.

FIG. 27A is a schematic diagram illustrating the leaf spring part 51 before the leaf spring part 51 is bent. In a case where the card 10 presses against the leaf spring 50 in the direction Y as illustrated in FIG. 26, the curved shape of the corner part 17X1 and the substantially triangular locking part 52 projecting in the direction X2 not only allow a strong compressive force F5 to affect the leaf spring part 51 in the direction Y1 (axial direction of the leaf spring 50) but also allow a force F6 to affect the leaf spring part 51 in the direction X1.

The second concave part 132 located toward the X1 side of the lug part 120 allows the locking part 52 to be displaced in the direction X1 by having the lug part 120 enter the second concave part 132.

Accordingly, in such a case where the force F5 and the force F6 are applied to the leaf spring part 51, the locking part 52 is displaced in the direction X1 and the leaf spring part 51 becomes bent. Thus, no buckling occurs in the leaf spring part 51. The bending of the leaf spring part 51 in the direction X1 is no greater than the elastic limit (limit of elasticity) of the leaf spring part 51. The leaf spring part 51 returns to its initial straight shape when the applying of forces F5 and F6 is terminated.

Hence, with the above-described embodiments of the card connector 20, permanent deformation can be prevented from occurring in the leaf spring part 51 of the leaf spring 50 even in a case where the card 10 is improperly inserted (e.g., slanted insertion) into the card connector 20. Therefore, in a case where the user improperly inserts the card 10 into the card connector 20, be it one time or a number of times repeatedly, the card connector 20 can continue to maintain its initial strength for holding the card 10 regardless of whether the slider 40 is in the card attached position or in the card ejecting position. Thus, the card 10 can be prevented from emerging or falling out from the card connector 20.

Figure 14:
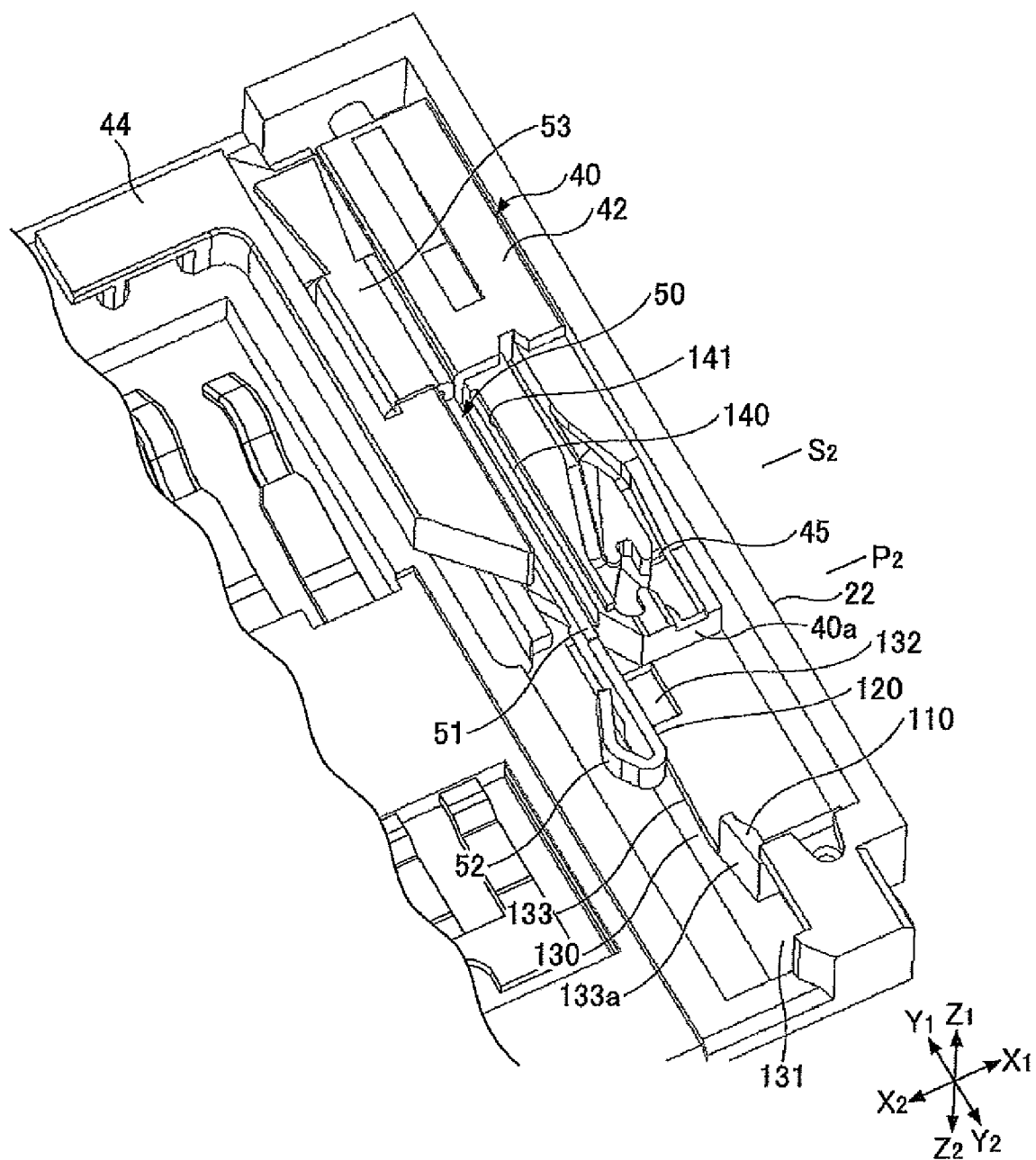
FIG. 14 is a perspective view illustrating a state where a slider is moved to a card attached position according to an embodiment of the present invention.

Further, as described above, the lug part 120 and the slit part 130 serving as the third excess bending preventing structure provide a function of preventing undesired detachment of the card 10 from the card connector 20. That is, as illustrated in FIGS. 14 and 15, in the case where the slider 40 is in the card attached position (position where the end face 40a is position in the position P2), the lug part 120 is positioned facing the wall 133, to thereby prevent the locking part 52 from being displaced in the direction X1. Therefore, even where an attempt is made to forcibly pull out the card 10 attached to the card connector 20, the concave part 16 does not disengage the locking part 52 but rather remains engaged with the locking part 52. Thus, the card 10 can be prevented from detaching from the card connector 20 where the slider 40 is in the card attached position.

Second Embodiment

Figure 28:
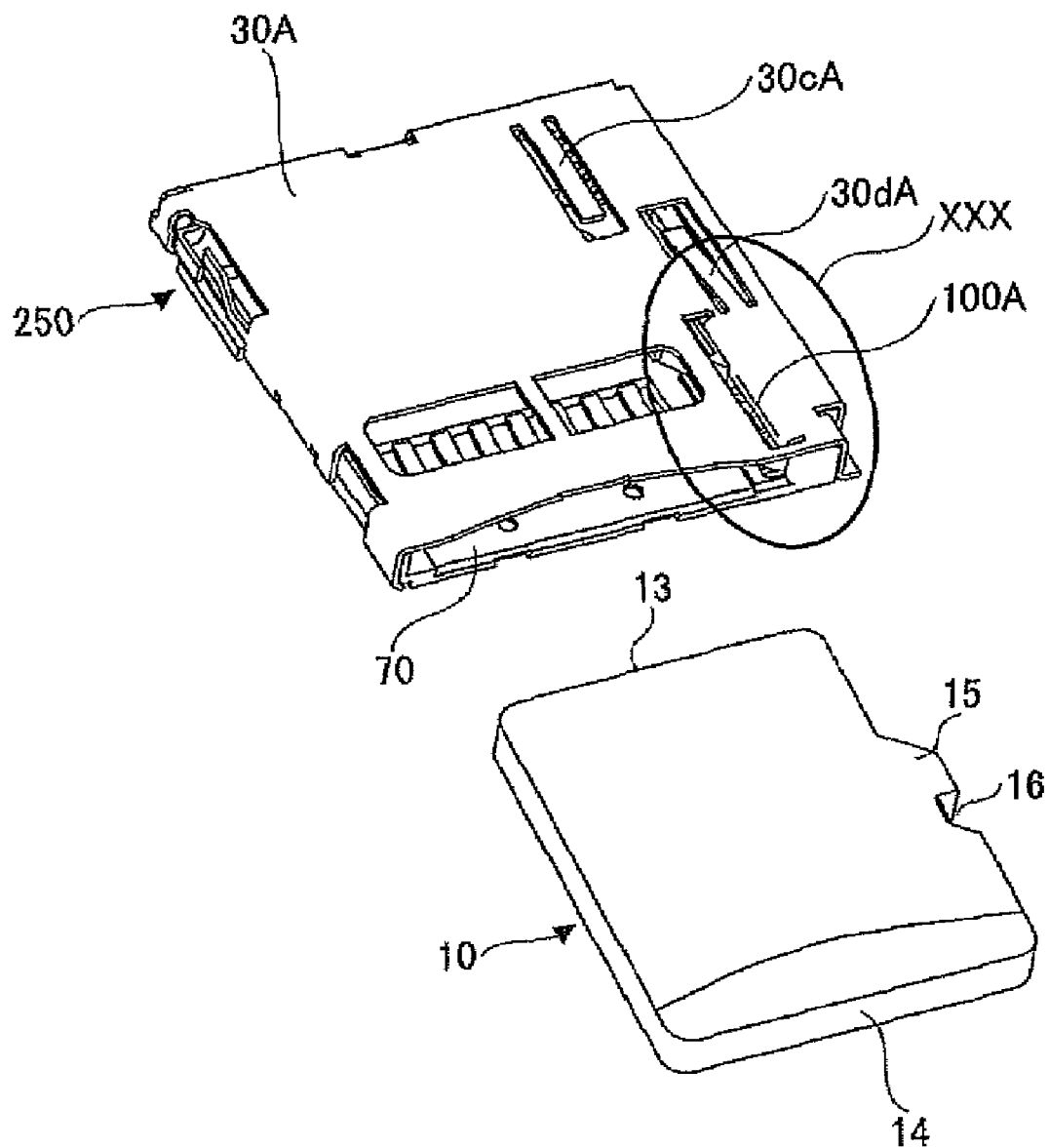
FIG. 28 is a perspective view illustrating a card connector according to a second embodiment of the present invention.
Figure 29A:
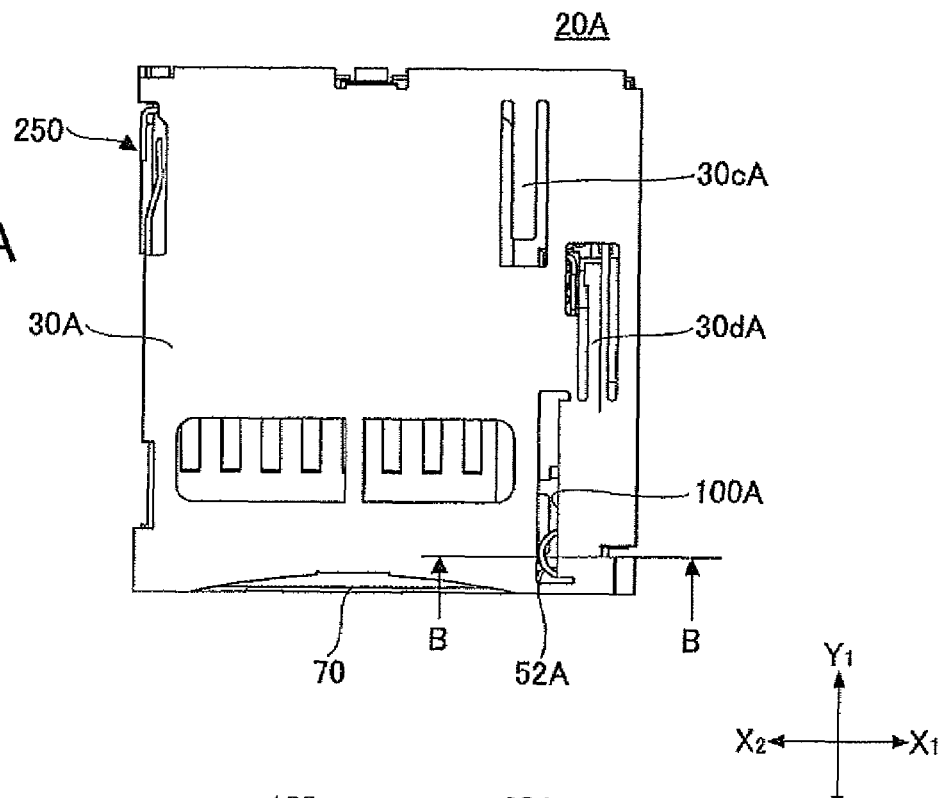
FIG. 29A is a plan view of a card connector according to an embodiment of the present invention.
Figure 29B:
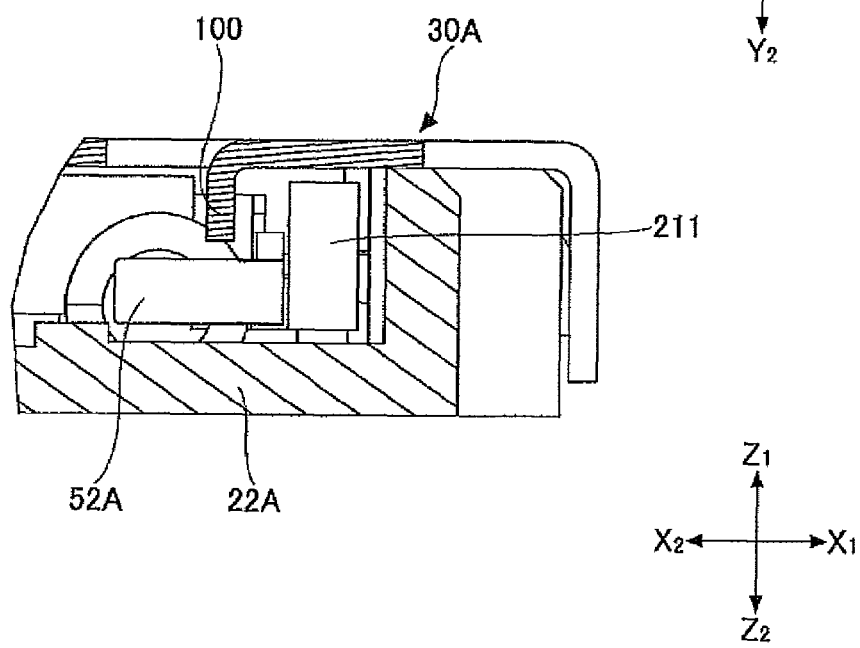
FIG. 29B is an enlarged cross-sectional view taken along line B-B of FIG. 29A.
Figure 31:
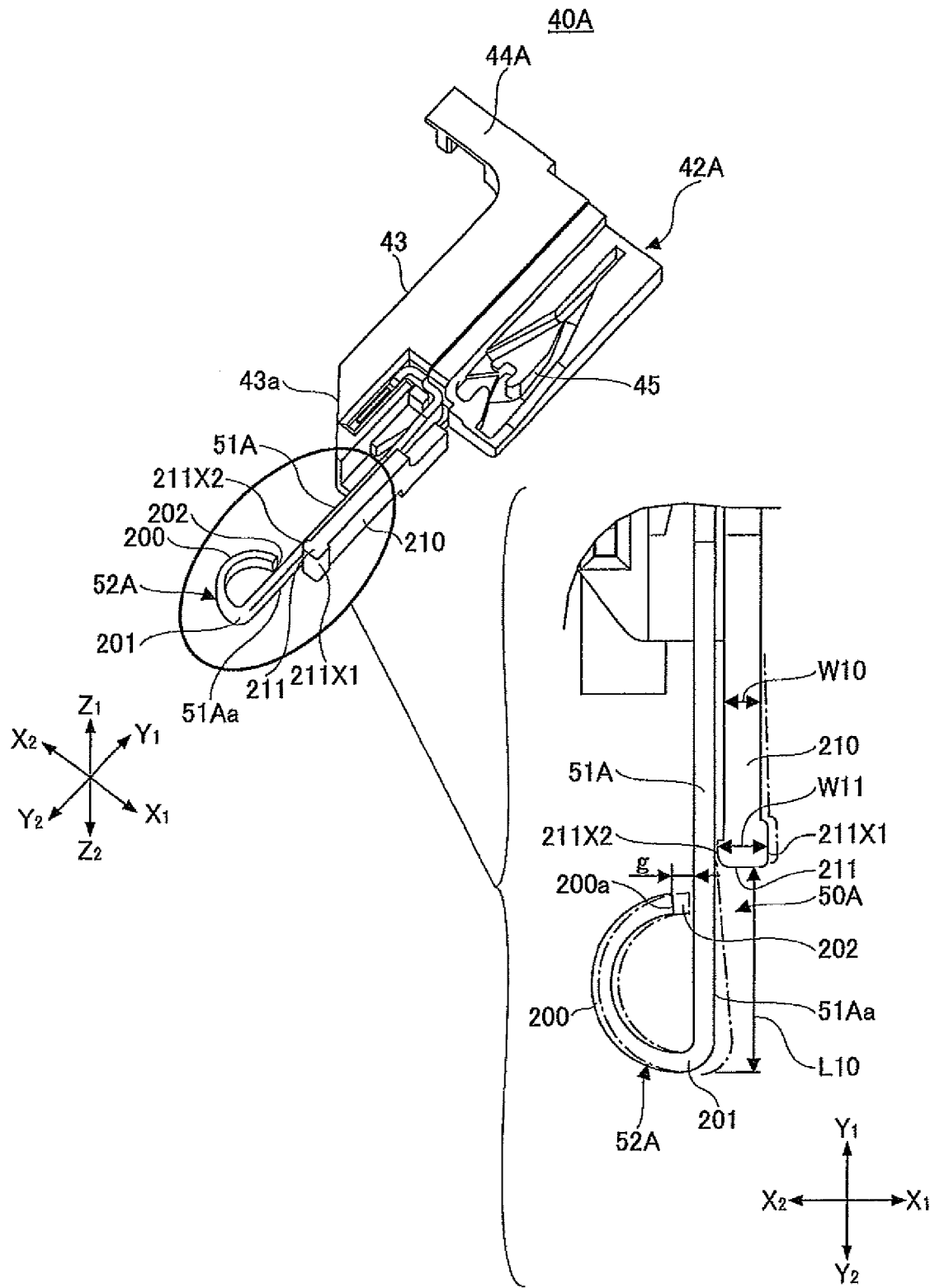
FIG. 31 is a schematic diagram illustrating a slider according to the second embodiment of the present invention.
Figure 32A:
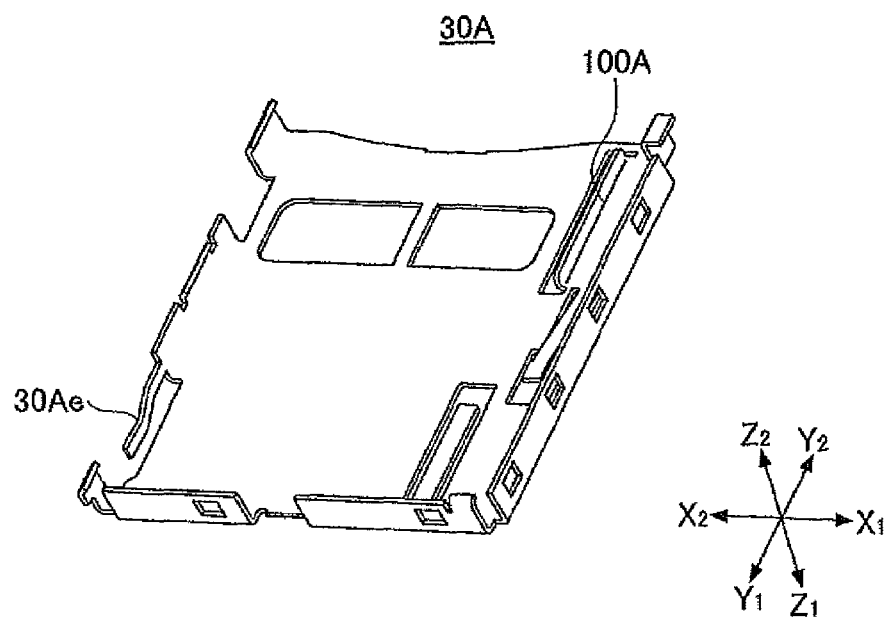
FIGS. 32A and 32B are schematic diagrams illustrating a cover according to the second embodiment of the present invention.
Figure 32B:
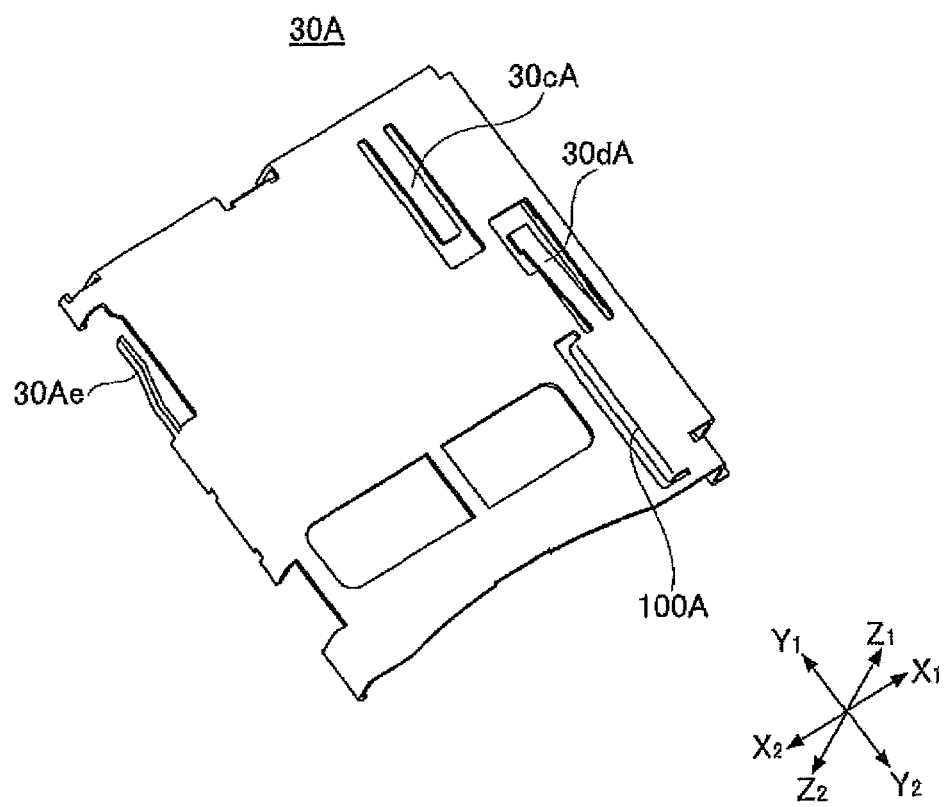

FIG. 28 is a perspective view illustrating a card connector 20A according to a second embodiment of the present invention. FIG. 29A is a plan view of the card connector 20A. FIG. 29B is an enlarged cross-sectional view taken along line B-B of FIG. 29A. FIG. 30 is an enlarged view illustrating a portion of the card connector 20A surrounded by a circle XXX of FIG. 28 where a cover 30A is removed from the card connector 20A. FIG. 31 is a schematic diagram illustrating a slider 40A according to the second embodiment of the present invention. FIGS. 32A and 32B are schematic diagrams illustrating the cover 30A according to the second embodiment of the present invention.

The card connector 20A of the second embodiment is substantially the same as the card connector 20 of the first embodiment. In the drawings and description of the second embodiment, like components of the card connector 20A are denoted with like reference numerals as those of the card connector 20 and are not further explained.

The card connector 20A includes, for example, a housing body 22A, a slider 40A, a compression coil spring (not illustrated), a heart cam mechanism 65, and the cover 30A. The cover 30A is formed of, for example, a metal plate material. Further, the card insertion slot 70 is provided at the end of the card connector 20A toward the direction Y2.

The cover 30A which covers the housing body 22A includes a card insertion guiding rail part 100A.

As illustrated in FIG. 31, the slider 40A includes, for example, a slider body 42A and a leaf spring 50A fixed to the slider body 42A.

The leaf spring 50A includes a cantilever leaf spring part (hereinafter referred to as "leaf spring part") 51A projecting in the direction Y2 from the slider body 42A and a locking part 52A formed at the tip of the leaf spring 50. The locking part 52A is formed into a substantially semi-circular shape projecting in the direction X2 by bending back the tip of the leaf spring 50A in the directions X2 and Y1. The locking part 52A has a semi-circular shaped cantilever portion 200 fixed to the leaf spring part 51A via a connecting portion 201 formed at an end of the locking part 52A in the direction Y2. A gap 202 is provided between a distal end 200a of the cantilever portion 201 and a surface of the leaf spring part 51A toward the direction X2. The gap 202 is formed with a predetermined distance g (distance between the distal end 200a and the surface of the leaf spring part 51A toward the direction X2). Due to the cantilever configuration of the cantilever portion 200, the locking part 52A can elastically bend in the direction X1 concentrically around the connection portion 201 until the distal end 200a contacts the leaf spring part 51A.

Thus, in addition to the leaf spring part 51A, the locking part 52A also exhibits a characteristic of a spring.

As illustrated in FIG. 31, the slider body 42A includes a projecting part 210 projecting in the direction Y2 at a side of the overhanging part 43 in the direction X1. The projecting part 210 is positioned immediately at an X1 side of the leaf spring part 51A and extends along the leaf spring part 51A. The projecting part 210 has a distal end part 211 exhibiting a slight spring characteristic that can bend in the directions X1 and X2. The projecting part 210 has a width W10 except at the distal end part 211. The distal end part 211 has a width W11 greater than the width W10. The distal end part 211 has overhanging portions projecting in the directions X1 and X2. A surface 211X2 of the overhanging portion toward the direction X2 is substantially in contact with the X1 side of the leaf spring part 51A at a middle portion of the leaf spring part 51A.

The middle portion of the leaf spring part 51A is located slightly more toward the slider body 42A (direction Y1) than the locking part 52A.

In a case where a strong force is applied to the locking part 52A in the direction X1, the projecting part 210 prevents the leaf spring part 51A from excessively bending in the direction X1 by supporting the middle portion of the leaf spring part 51A.

The leaf spring part 51A has a free end part 51Aa extending further in the direction Y2 than the distal end part 211 of the projecting part 210. A length L10 of the free end part 51Aa is the distance between the distal end part 211 and an end of the free end part 51Aa toward the direction Y2.

As illustrated in FIG. 30, in the case where the slider 40A is in a card ejecting position P1, the locking part 52A is positioned in the vicinity of the card insertion slot 70. With respect to the directions Z1-Z2, the locking part 52A is positioned more toward the direction Z2 than the card insertion guiding part 100A.

Figure 34:
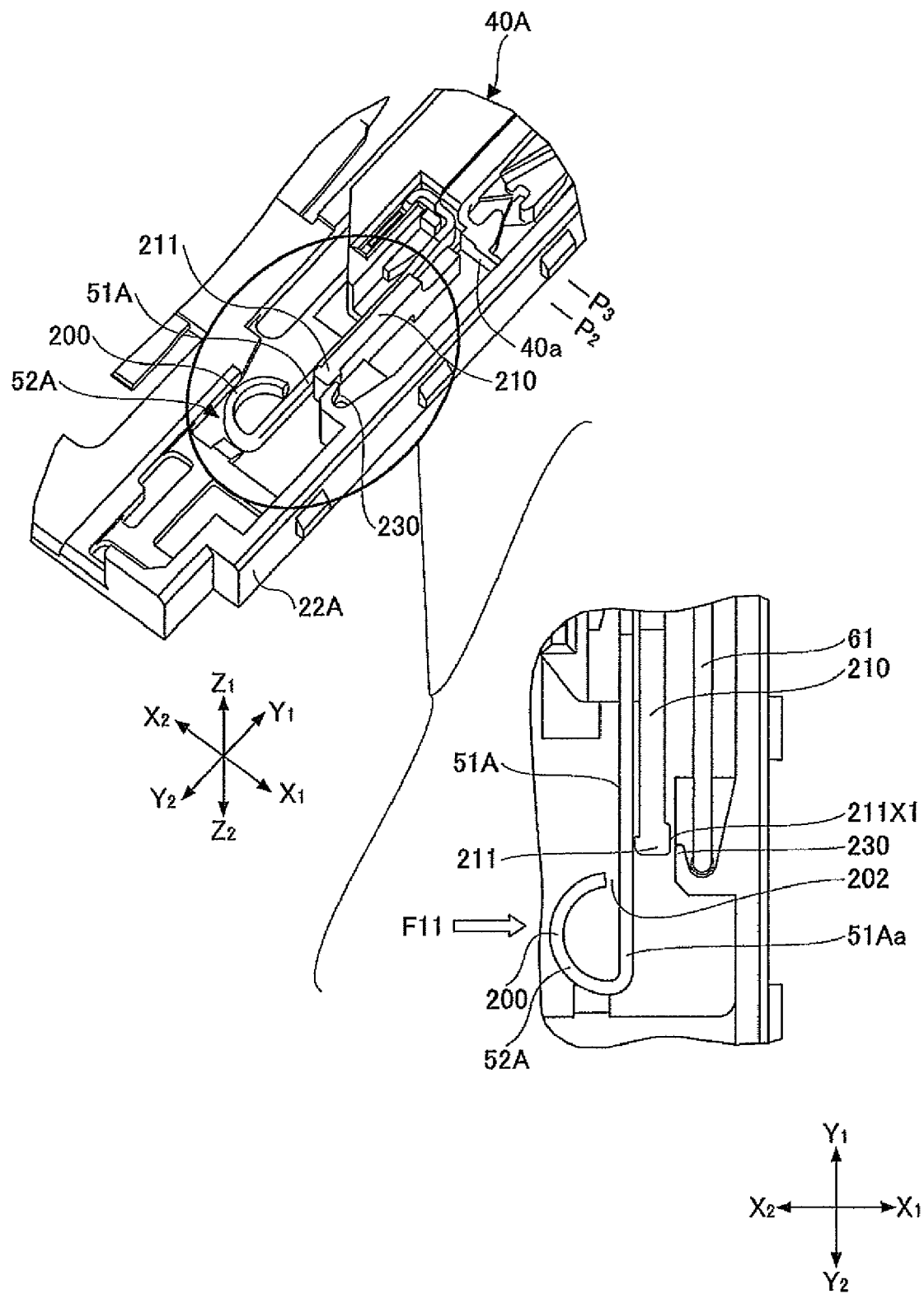
FIG. 34 is a schematic diagram illustrating where a slider is moved to a card attached position according to an embodiment of the present invention.

FIG. 33 is a schematic diagram illustrating where the slider 40A is moved to the maximum insertion position (position where the end face 40a is in position P3). FIG. 34 is a schematic diagram illustrating where the slider 40 is moved to the card attached position (position where the end face 40a is in position P2).

As illustrated in FIG. 34, the housing body 22A includes a rib part 230 facing the surface 211X1 of the distal end part 211 of the projecting part 210 where the slider 40 is in the card attached position (position where the end face 40a is in the position P2).

Next, operations of the locking part 52A are described in a case where the card 10 is properly inserted and in a case where the card 10 is improperly inserted.

In a case where the card 10 is properly inserted, the locking part 52A is pressed by the convex part 15 and is temporarily displaced in the direction X1. Then, the locking part 52A recovers back in the direction X2 and engages the concave part 16. In such a case where the locking part 52A is temporarily displaced in the direction X1, the cantilever part 200 of the locking part 52A elastically bends together with the free end part 51Aa as illustrated with a dot-dash line in FIG. 31. Further, in such case where the locking part 52A is temporarily displaced in the direction X1, the projecting part 210 also elastically bends slightly in the direction X1.

Similarly, in a case where the card 10 is ejected from the card connector 20A, for example, by having the user pinch and pull the sides of the rear end surface 14 in the direction Y2, the locking part 52A is pressed out from the concave part 16 and is temporarily displaced in the direction X1. Then, the locking part 52A recovers back in the direction X2. Likewise, in the case where the card 10 is ejected from the card connector 20A, the cantilever part 200 of the locking part 52A elastically bends together with the free end part 51Aa as illustrated with a dot-dash line in FIG. 31. Further, in such case where the card 10 is ejected from the card connector 20A, the projecting part 210 also elastically bends slightly in the direction X1.

In this embodiment, since elastic bending occurs at three parts of the card connector 20A, (in this embodiment, the free end part 51Aa, the cantilever part 200, and the projecting part 210), the force applied to the elastic bending parts can be scattered (distributed over a wider cross-sectional area). Thus, the stress applied to each of the elastic bending parts can be reduced.

Next, an operation of preventing permanent deformation of the leaf spring 50A by preventing the leaf spring 50A from excessively bending is described.

<Case of Slanted Insertion of Card 10>

In a case where the card 10 is inserted in the card insertion slot 70 in a slanted manner as illustrated in FIG. 17A, the card 10 presses the locking part 52A in the direction X1. The card insertion guiding rail part 100A receives the card 10 inserted in the slanted manner and prevents the card from being displaced further toward the direction X1. Thus, the leaf spring part 51A is prevented from being excessively bent in the direction X1.

The card insertion guiding rail part 100A also serves to correct the slanted insertion of the card 10. Further, the card insertion guiding rail part 100A also serves to restrict insertion of the card 10 in a case where the card 10 is inadvertently inserted from the rear end surface 14 of the card 10.

<Case where a Force F10 is Applied to the Locking Part 52A in the Direction X1 where the Card 10 is Inserted to the Maximum Position in the Direction Y1 and the Slider 40A is Moved to the Maximum Insertion Position (Position where the End Face 40a is in the Position P3)>

In this case, the surface 211X2 of the overhanging portion of the projecting part 210 receives the X1 side of the leaf spring part 51A at the middle portion of the leaf spring part 51A located slightly more toward the Y1 direction than the locking member 52A (see FIG. 31). Thereby, the leaf spring part 51A can be prevented from excessively bending in the direction X1. When the middle portion of the leaf spring part 51A is received by the surface 211X2, the projecting part 210 itself also bends slightly toward the direction X1.

Further, the cantilever part 200 of the locking part 52A elastically bends to enable the locking part 52A to absorb part of the force F10.

The receiving function of the projecting part 210 is also exhibited not only when the card 10 is moved to the maximum position but also when the front end surface 13 of the card 10 is moved in the direction Y1 beyond the card insertion guiding rail part 100 but to a position before the maximum position of the card 10.

<Case where a Force F11 is Applied to the Locking Part 52A in the Direction X1 where the Card 10 is Attached to the Card Connector 20A and the Slider 40A is Moved to the Card Attached Position of the Slider 40>

In this case, the force F11 is generated, for example, when the card 10 attached to the card connector 20A is forcibly pulled out from the card connector 20A (see FIG. 34).

In this case also, the surface 211X2 of the overhanging portion of the projecting part 210 receives the X1 side of the leaf spring part 51A at the middle portion of the leaf spring part 51A located slightly more toward the Y1 direction than the locking member 52A (see FIG. 31). Thereby, the leaf spring part 51A can be prevented from excessively bending in the direction X1.

As illustrated in FIG. 34, the rib part 230, which faces the surface 211X1 of the distal end part 211 of the projecting part 210, prevents the projecting part 210 from excessively bending in the direction X1.

Accordingly, even in a case where a strong force is applied to the projecting part 210 in the direction X1, the rib part 230 can prevent the projecting part 210 from excessively bending in the direction X1. Thereby, the leaf spring part 51 can be prevented from excessively bending in the direction X1.

Therefore, the locking force between the card 10 and the slider 40A (engagement between the locking part 52 and the concave part 16) can be increased. Accordingly, the card 10 can be prevented from disengaging the card connector 20A even in a case where, for example, there is an attempt to forcibly pull the card 10 out from the card connector 20A or where a mechanical shock is applied to an electronic device (e.g., mobile phone) to which the card 10 is attached.

[Switch 250 for Detecting Card Insertion]

Figure 35:
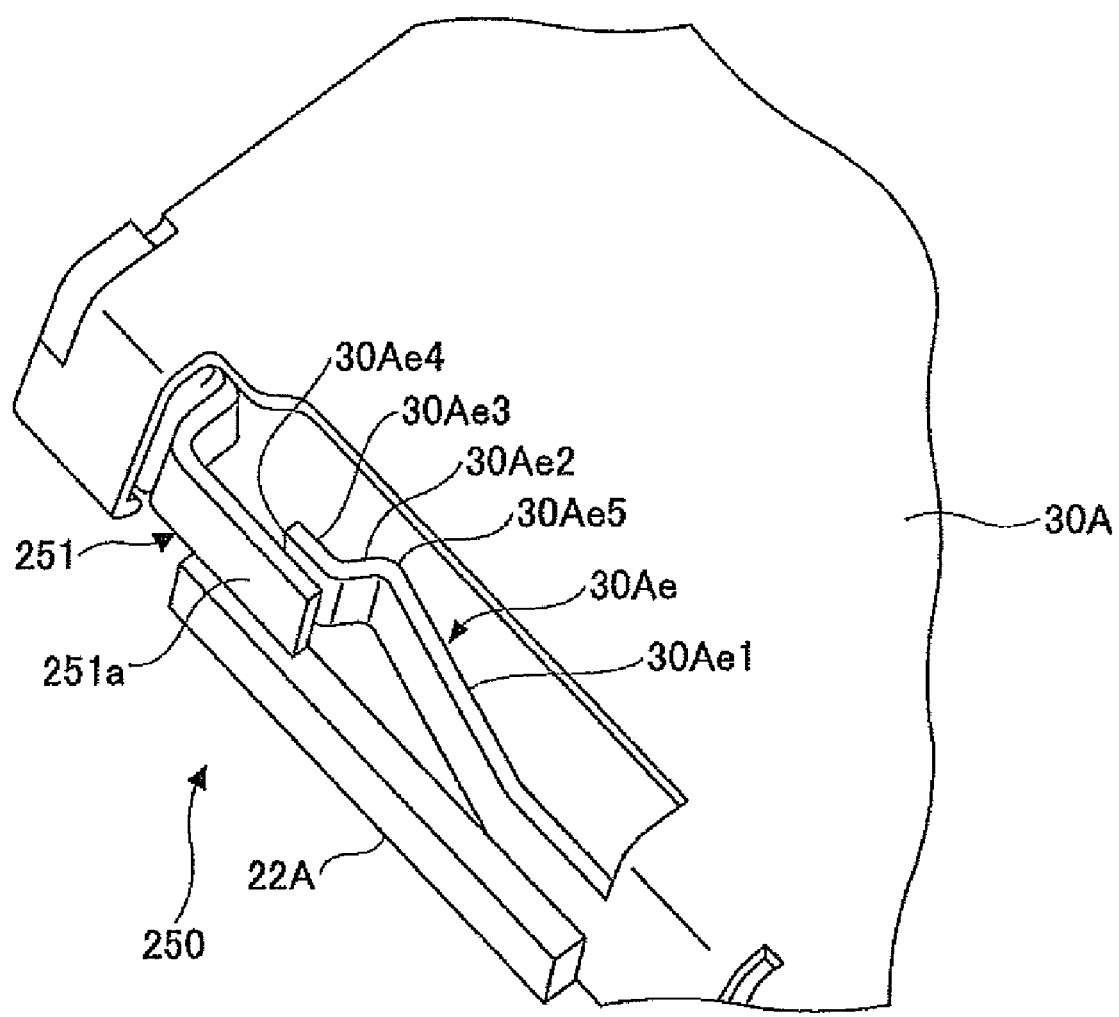
FIG. 35 is a perspective view illustrating a portion of a switch according to an embodiment of the present invention.

FIG. 35 is a schematic diagram illustrating a switch 250 for detecting insertion of the card 10 into the card connector 20A. As illustrated in FIG. 32A, the switch 250 is provided in the vicinity of a corner part of the cover 30A located toward the directions X2 and Y1 (see FIGS. 32A and 35). The switch 250 includes, a first contact part 30Ae and a second contact part 251.

The first contact part 30Ae is formed by extending a part of the cover 30A as illustrated in FIGS. 32A and 32B. The cover 30A is formed of, for example, a metal plate material. The first contact part 30Ae includes an arm part (proximal end part) 30Ae1 provided at its proximal end, a middle part 30Ae2 provided at its middle section 30Ae2, and a finger part (distal end part) 30Ae3 provided at its distal end.

As illustrated in FIG. 35, the arm part 30Ae1 extends substantially in the direction Y1. When viewed from the direction Z1 in FIG. 36A, the arm part 30Ae1 is inclined with respect to the directions Y1-Y2 in a clockwise direction at an angle $\alpha$ (for example, approximately 10 degrees).

At an end of the arm part 30Ae1 toward the direction Y1, the middle part 30Ae2 is provided in a manner bending in a counter-clockwise direction at an angle $\beta$ (for example, approximately 60 degrees).

At an end of the middle part 30Ae2 toward the direction X2, the finger part 30Ae3 is provided extending substantially in the direction Y1. Reference numeral 30Ae4 indicates an end part of the finger part 30Ae3.

The arm part 30Ae1 and the middle part 30Ae2 form a mountain-like (convex) shape projecting in the direction X1. Reference numeral 30Ae5 indicates a peak part of the mountain-like shape.

With reference to FIGS. 35 and 36, the second contact part 251 includes a distal end part 251a fixed to a part of the housing body 22A toward the direction Y1. The distal end part 251a of the second contact part 251 is positioned more toward the direction X2 than the finger part 30Ae3. The distal end part 251a extends straight in the direction Y2.

As illustrated in FIG. 36A, a gap 252 is provided between the finger part 30Ae3 and the distal end part 251a. The gap 252 is formed with a predetermined distance g10 (distance between the finger part 30Ae3 and the distal end part 251a in the directions X1-X2).

A part of the distal end part 251a (contact part) anticipated to make first contact with the end part 30Ae4 of the finger part 30Ae3 is indicated as reference numeral U1. Reference numeral L10 indicates the length between an end of the distal end part 251a toward the direction Y1 and the contact part U1. The length L10 is relatively long so that the distal end part 251a can easily bend in the direction X2 when a force in the direction X2 is applied to the contact part U1.

The peak part 30Ae5 is the part of the first contact part 30Ae affected by the force applied in the direction X2. The end of the first contact part 30Ae (part corresponding to the middle part 30Ae2 and the finger part 30Ae3) positioned more toward the end part 30Ae4 than the peak part 30Ae5 is formed substantially in an L-like shape. Further, since the finger part 30Ae3 is relatively short compared to the distal end part 251a, the finger part 30Ae3 is more difficult to bend compared to the distal end part 251a.

Next, an operation of the switch 250 is described in a case where the card 10 is inserted to the card connector 20A.

The cover 30A is at ground potential when the card connector 20A is mounted on a printed circuit board and assembled in an electronic device such as a mobile phone. In this state, the first contact part 30Ae is at ground potential. The other end of the second contact part 251 is soldered to a pad provided on an end of a wiring pattern that continues to a control circuit (not illustrated). Thereby, the distal end part 251a of the second contact part 251 becomes electrically connected to the control circuit.

FIG. 36A is a schematic diagram illustrating the switch 250 before the card 10 is inserted into the card connector 20A. The finger part 30Ae3 of the first contact part 30Ae and the distal end part 251a of the second contact part 251 face each other across the gap 252; the switch 250 is in an off state.

FIG. 36B is a schematic diagram illustrating the switch 250 where the card 10 is inserted into the card connector 20A. When the card 10 is inserted into the card connector 20A, the corner part 17X2 of the card 10 abuts the arm part 30Ae1 and bends the arm part 30Ae1 in the direction X2. Thereby, the end part of the finger part 30Ae3 contacts an X1 surface 251b of the distal end part 251a at the contact part U1 so that the switch 250 is in an on state.

Figure 36C:
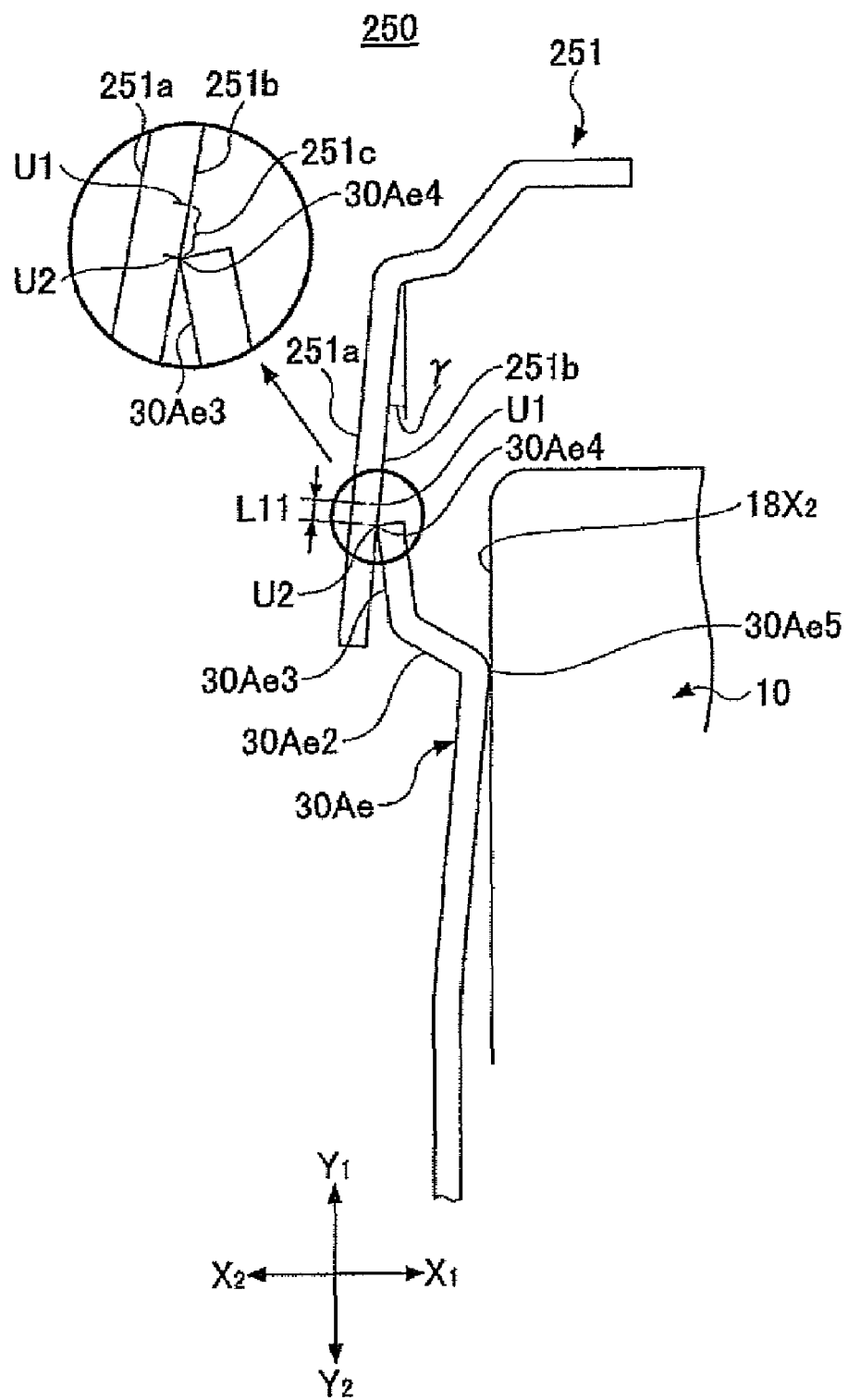
FIG. 36C is a schematic diagram illustrating a switch where a card is inserted to a maximum insertion position according to an embodiment of the present invention.

FIG. 36C is a schematic diagram illustrating the switch 250 where the card 10 is inserted to the maximum insertion position (position where the rear end surface 14 is in position Q3) as illustrated in FIG. 4. When the card 10 is being moved to the maximum insertion position, the side surface 18X2 presses the peak part 30Ae5 in the direction X2 and bends the first contact part 30Ae in the direction X2. The distal end part 251a is pressed in the direction X2 by the finger part 30Ae3 and bent to an angle $\gamma$. In this case where the card 10 is being moved to the maximum insertion position, the end part 30Ae4 brushes against the X1 surface 251b of the distal end part 251a as the end part 30Ae4 moves in the direction Y2 until reaching a contact part U2. After the end part 30Ae4 reaches the contact part U2, the end part 30Ae4 remains pressed against the distal end part 251a at the contact part U2 so that the switch 250 is in an on state.

Since the distal end part 251a bends while the middle part 30Ae2 and the finger part 30Ae3 hardly bend when moving the card 10 to the maximum insertion position, a distance (wiping distance) L11 between the contact part U1 and the contact part U2 becomes longer compared to a case where both the finger part 30Ae3 and the distal end part 251a bend substantially in the same amount. In this embodiment, a wiping distance of approximately 0.1 mm can be attained.

When ejecting the card 10 from the card connector 20A, the switch 250 returns to the state illustrated in FIG. 36B. In the transition from the state illustrated in FIG. 36C to FIG. 36B, the end part 30Ae4 brushes against the X1 surface 251b of the distal end part 251a and moves in the direction Y1 until reaching the contact part U1. Then, the switch 250 further returns to the state illustrated in FIG. 36A. Thereby, the switch 250 becomes off.

Accordingly, whenever the card 10 is attached and mounted to/removed from the card connector 20A, a contacting area 251c (see FIG. 36C) of the X1 surface 251b of the distal end part 251a between the contact part U1 and the contact part U2 can be cleaned. At the same time, the end part 30Ae4 of the finger part 30Ae3 can also be cleaned. In general, a higher cleaning performance can be attained the longer the wiping distance is. Since the card connector 20A can attain a relatively long wiping distance of approximately 0.1 mm, a high cleaning performance can be attained at the contacting area 251c.

In a case where a typical card connector is assembled at a side surface of an electronic device (e.g., mobile phone) in an uncovered manner, the card connector may constantly be exposed to dust and may allow the dust to easily accumulate on a contact of a switch of the card connector. This might prevent electrical conduction from occurring when the card is attached to the card connector. As a result, a card detecting switch of the card connector might not become on.

However, with the above-described card connector 20A having the switch 250, the contacting area 251c can be maintained in a clean state because the contacting area 251c of the switch 250 is cleaned whenever the card 10 is attached and mounted to/removed from the card connector 20A. This enables the switch 250 to become on consistently. The card connector 20A having the switch 250 is suitable to be used for an electronic device (e.g., mobile phone) where it is preferred to avoid accumulation of dust.

Further, the present invention is not limited to these embodiments, but variations and modifications may be made without departing from the scope of the present invention.

The present application is based on Japanese Priority Application Nos. 2008-022925, 2008-071751, and 2008-178794 filed on Feb. 1, 2008, Mar. 19, 2008, and Jul. 9, 2008, respectively, with the Japanese Patent Office, the entire contents of which are hereby incorporated by reference.

What is claimed is:

1. A card connector for inserting a card therein, the card connector including a housing body having a contact, a cover covering the housing body, a slider being movable between a card ejected position and a card attached position, the slider including a slider body and a leaf spring part attached to the slider body for elastically locking to the card, the card connector comprising:
   an excess bending preventing part configured to prevent permanent deformation of the leaf spring part by the card being inserted into the card connector in an irregular manner.

2. The card connector as claimed in claim 1, wherein the excess bending preventing part includes a card insertion guiding rail part configured to guide the card being inserted into the card connector, wherein the card insertion guiding rail part is a portion of the cover that is bent toward the housing body.

3. The card connector as claimed in claim 1, wherein the excess bending preventing part includes a projecting receiver part configured to receive the leaf spring part in a case where the leaf spring part is bent by the card being inserted into the card connector in the irregular manner, wherein the projecting receiver part is a portion of the housing body.

4. The card connector as claimed in claim 1, wherein the excess bending preventing part includes
   a lug part projecting from the leaf spring part and configured to travel in correspondence with the card inserted into the card connector, and
   a slit part formed in the housing body along a path in which the lug part travels,
   wherein the slit part includes a wall configured to receive the lug part in a case where the leaf spring part is bent by the card being inserted into the card connector in the irregular manner.

5. The card connector as claimed in claim 4, wherein the slit part includes a concave part formed at a part of the slit part corresponding to a position at which the lug part is located when the slider is in a maximum insertion position, wherein the maximum insertion position is a position where the slider is moved further into the card connector than the card attached position.

6. The card connector as claimed in claim 1, wherein the excess bending preventing part includes a groove part formed in the slider body, wherein the groove part is configured to have installed the leaf spring part therein.

7. The card connector as claimed in claim 1, wherein the leaf spring part includes a locking part formed at a tip of the leaf spring part, wherein the locking part has a cantilever portion, wherein a gap is provided between a distal end of the cantilever portion and the leaf spring part.

8. The card connector as claimed in claim 7, wherein the excess bending preventing part includes a projecting part configured to support a middle portion of the leaf spring part.

9. The card connector as claimed in claim 8, wherein the middle portion of the leaf spring part is located slightly more toward the slider body than the locking part.

10. The card connector as claimed in claim 8, wherein the housing body includes a rib part facing the projecting part when the slider is in the card attached position.

11. The card connector as claimed in claim 1, wherein the card includes a front end surface, wherein the irregular manner is where the front end surface is slanted with respect to a width direction of the card connector.

* * * * *